(12) United States Patent
Filippov et al.

(10) Patent No.: US 11,445,181 B2
(45) Date of Patent: Sep. 13, 2022

(54) METHOD AND APPARATUS FOR PREDICTING MOST PROBABLE INTRA-MODES

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/205,350

(22) Filed: Mar. 18, 2021

(65) Prior Publication Data

US 2021/0250578 A1     Aug. 12, 2021

Related U.S. Application Data

(63) Continuation of application No. PCT/CN2019/106627, filed on Sep. 19, 2019.

(60) Provisional application No. 62/733,580, filed on Sep. 19, 2018.

(51) Int. Cl.
*H04N 19/105* (2014.01)
*H04N 19/159* (2014.01)
*H04N 19/176* (2014.01)
*H04N 19/423* (2014.01)

(52) U.S. Cl.
CPC ........ *H04N 19/105* (2014.11); *H04N 19/159* (2014.11); *H04N 19/176* (2014.11); *H04N 19/423* (2014.11)

(58) Field of Classification Search
None
See application file for complete search history.

(56) References Cited

U.S. PATENT DOCUMENTS

| | | |
|---|---|---|
| 2014/0269908 A1* | 9/2014 | Oh ........................ H04N 19/463 375/240.03 |
| 2014/0269914 A1 | 9/2014 | Oh et al. |
| 2016/0134867 A1 | 5/2016 | Oh et al. |
| 2016/0373769 A1 | 12/2016 | Zhao et al. |
| 2017/0332084 A1 | 11/2017 | Seregin et al. |

(Continued)

FOREIGN PATENT DOCUMENTS

| CN | 102857750 A | 1/2013 |
|---|---|---|
| CN | 107105252 A | 8/2017 |

(Continued)

OTHER PUBLICATIONS

JVET-K1001-v5, Bross, B., et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 136 pages.

(Continued)

*Primary Examiner* — Michael J Hess
(74) *Attorney, Agent, or Firm* — Conley Rose, P.C.

(57) ABSTRACT

A method for constructing a Most Probable Mode (MPM) list includes classifying each intra prediction mode derived from a neighboring block either as a valid or invalid subject to the mode direction and the position of its source block. Valid and invalid modes are considered most and least probable modes, respectively.

20 Claims, 10 Drawing Sheets

(56) References Cited

U.S. PATENT DOCUMENTS

| | | | |
|---|---|---|---|
| 2018/0184082 A1* | 6/2018 | Yoo | H04N 19/176 |
| 2019/0104303 A1* | 4/2019 | Xiu | H04N 19/59 |
| 2019/0166375 A1* | 5/2019 | Jun | H04N 19/159 |
| 2019/0373285 A1* | 12/2019 | Vanam | H04N 19/11 |
| 2020/0045322 A1* | 2/2020 | Ye | H04N 19/159 |
| 2020/0169752 A1* | 5/2020 | Rath | H04N 19/176 |

FOREIGN PATENT DOCUMENTS

| | | |
|---|---|---|
| CN | 107750457 A | 3/2018 |
| CN | 109547782 A | 3/2019 |
| CN | 110166772 A | 8/2019 |
| WO | 2017196957 A1 | 11/2017 |
| WO | 2018064948 A1 | 4/2018 |
| WO | 2019072366 A1 | 4/2019 |

OTHER PUBLICATIONS

ITU-T H.261, "Line Transmission of Non-Telephone Signals, Video Codec for Audiovisual Services at p×64 kbits," Mar. 1993, 29 pages.

ITU-T H.262, "Series H: Audiovisual and Multimedia Systems, Infrastructure of audiovisual services—Coding of moving video Information technology—Generic coding of moving pictures and associated audio information: Video: Frame packing arrangement signalling for 3D content, Amendment 4," Feb. 2012, 238 pages.

ITU-T H.264, "Series H: Audiovisual and Multimedia Systems, Infrastructure of audiovisual services—Coding of moving video, Advanced video coding for generic audiovisual services," Apr. 2017, 812 pages.

ITU-T H.265, "Series H: Audiovisual and Multimedia Systems Infrastructure of audiovisual services—Coding of moving video, High efficiency video coding," Feb. 2018, 692 pages.

JVET-K0365, Kotra (Huawei) A M et al., "CE3.2.2: Intra mode signaling with priority based MPM and non-MPM list construction", 11. JVET Meeting; Jul. 11, 2018-Jul. 18, 2018; Ljubljana; (The Joint Video Exploration Team of 1S0/IEC JTC1/SC29/WG11 and ITU-T SG.16 ), Jul. 11, 2018, XP030199462, 12 pages.

JCTVC-G359, Robert Cohen ET A., Non-CE6: Coding of luma intra prediction modes that are not in the MPM set, Mitsubishi Electric Research Laboratories Cambridge, Massachusetts, 7th JCT Meeting, Geneva, Nov. 21-30, 2011, XP030230557, 9 pages.

* cited by examiner

METHOD AND APPARATUS FOR PREDICTING MOST PROBABLE INTRA-MODES

CROSS-REFERENCE TO RELATED APPLICATIONS

This application is a continuation of International Patent Application No. PCT/CN2019/106627 filed on Sep. 19, 2019, which claims the priority of U.S. Provisional Patent Application No. 62/733,580 filed on Sep. 19, 2018, both of which are hereby incorporated by reference in their entireties.

TECHNICAL FIELD

The present disclosure relates to the technical field of image and/or video coding and decoding, and in particular to method and apparatus for intra prediction.

BACKGROUND

Digital video has been widely used since the introduction of digital versatile discs (DVDs). Before transmission the video is encoded and transmitted using a transmission medium. The viewer receives the video and uses a viewing device to decode and display the video. Over the years the quality of video has improved, for example, because of higher resolutions, color depths and frame rates. This has led into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PUs) or transform units (TUs). The Versatile Video Coding (VVC) next generation standard is the most recent joint video project of the International Telecommunication Union Telecommunication Standardization Sector (ITU-T) Video Coding Experts Group (VCEG) and the International Standards Organization (ISO)/International Electrotechnical Commission (IEC) Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these CUs (also referred to as blocks) depend on their size, spatial position and a coding mode specified by an encoder. Coding modes can be classified into two groups according to the type of prediction intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (Joint Technical Committee (JTC) 1/subcommittee (SC) 29/working group (WG) 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the JVET to evaluate compression technology designs proposed by their experts in this area.

The Versatile Test Model (VTM) standard uses 35 Intra modes whereas the Benchmark Set (BMS) uses 67 Intra modes.

The intra mode coding scheme currently described in BMS is considered complex and a disadvantage of non-selected mode set is that the index list is always constant and not adaptive based on the current block properties (for e.g. its neighboring blocks INTRA modes).

SUMMARY

Apparatus and method for intra prediction are disclosed. The apparatus and method use a mapping process to simply the calculation procedure for intra prediction, so as to improve coding efficiency. The scope of protection is defined by the independent claims. Some of the advantageous embodiments are provided by the dependent claims.

According to an embodiment, a method is provided for constructing a Most Probable Mode (MPM) list for intra prediction, the method comprising obtaining an intra prediction mode of a first neighbor block adjacent to a current block, if the intra prediction mode of the first neighbor block is different from an intra prediction mode has been obtained from a second neighbor block, determining the validity for the intra prediction mode, storing the intra prediction mode into a corresponding validity buffer out of several validity buffers according to the validity of the intra prediction mode, and fetch intra prediction modes from the several validity buffers into the MPM list, starting from the validity buffer with the most number of intra prediction modes until the MPM list contains a maximum number of prediction modes or all the prediction modes that are stored in the validity buffers are fetched into MPM list. The method may facilitate MPM construction and, in particular, provide an MPM including modes with higher validity for the prediction of the current block, e.g. that enable prediction of more samples in the current block. Thus, efficient coding of the intra prediction mode is enabled.

For example, the validity value depends on at least one of the following whether or not the intra prediction mode is a directional mode, on which side of the current block the first neighboring block is located, and/or direction of the intra prediction mode.

In some exemplary implementations, the determining the validity for the intra prediction mode comprises, if the intra prediction mode is non directional, the validity is set to a value VALID_NON_DIR, if the first neighbor block is located to the left of the current block, and the intra prediction mode is greater or equal than HOR_IDX and the intra prediction mode is lesser than VER_IDX−dblStrictThr, the validity is set to a value VALID_DIR, if neighboring block is located above of the current block, and the intra prediction mode is greater than HOR_IDX+dblStrictThr and the intra prediction mode is lesser or equal than VER_IDX, the validity is set to VALID_DIR, wherein HOR_IDX is the index of a horizontal prediction mode, VER_IDX is the index of a vertical prediction mode, and dblStrictThr is a pre-configured threshold.

Valid non directional modes and valid directional modes may provide for prediction of more samples in the current block than other categories of validity.

For example, dblStrictThr is equal to 4. This may be value 4 among 0-66 (e.g. covering directions from $\pi/4$ to $5\pi/4$) or among −10 to 76 (e.g. covering directions from ca. $\pi/4-x$ to $5\pi/4+x$, x being smaller than $\pi/4$) intra modes as shown in FIGS. 4, 7, and 13.

In some exemplary implementations, the validity for a first buffer of the several validity buffers $FIFO_0$ is VALID_DIR, validity for a second buffer of the several validity buffers $FIFO_1$ is VALID_NON_DIR which is lower than VALID_DIR.

In some exemplary additional or alternative implementations the validity for the first neighbor block being the left or below left neighbor block is set to VALID_DIR, if the intra prediction mode is greater than −10 (corresponding to range x mentioned above) and is lesser than HOR_IDX, and/or if the intra prediction mode is equal to or greater than VER_IDX−strictThr and equal to or less than VER_IDX+strictThr, then the validity is set to a value STRICTLY_INVALID_DIR.

For example, the value STRICTLY_INVALID_DIR is lower than the value VALID_DIR and lower than the value VALID_NON_DIR.

For instance, the validity for the first neighbor block being the above or above right neighbor block is set to VALID_DIR, if the intra prediction mode is greater than VER_IDX and is lesser than 76 (e.g. when 66 corresponds to $\pi/4$ as in FIG. 13, 76 corresponds to 66+x, x=10 as mentioned above), and/or if the intra prediction mode is equal to or greater than HOR_IDX−strictThr and equal to or less than HOR_IDX+strictThr, then the validity is set to STRICTLY_INVALID_DIR.

In some exemplary implementations in addition or alternatively, the validity for the first neighbor block being the above-left neighbor block is set to VALID_DIR, if the intra prediction mode is greater than HOR_IDX and is lesser than VER_IDX, and/or if the intra prediction mode is equal to or greater than VDIA_IDX−strictThr and equal to or less than 2+strictThr, then the validity is set to STRICTLY_INVALID_DIR.

It is noted that the particular values of strictThr and the numerical values such as 2, 4, or 10 mentioned above may be also different and they may be adapted to a particular direction labeling and granularity. In addition or alternatively, the intra prediction mode is stored into the buffer having the same validity identification as determined for the intra prediction mode, it is checked whether VALID_DIR and VALID_NON_DIR buffers store the number of intra prediction modes that is equal or greater than the maximum MPM list size, and if the VALID_DIR and VALID_NON_DIR buffers store the number of intra prediction modes that is equal or greater than the maximum MPM list size, the MPM list is filled.

In addition or alternatively, the buffer with validity of STRICTLY_INVALID_DIR is not used to populate the MPM list, and/or if the intra prediction mode has STRICTLY_INVALID_DIR validity, it is not pushed to any of the buffers. In other words, STRICTLY_INVALID_DIR modes are not stored in any validity buffer and/or not entered into the MPM list which enables reduction of buffer requirements and complexity.

For example, if the number of intra prediction modes stored in the buffers is less than the size of the MPM list, the vacant positions within the MPM list are filled by default modes. Default modes may be predefined and prescribes by standard or in another way.

According to an embodiment, a method is provided for decoding an image including the steps of inferring from an encoded bitstream a mode indication, the method for constructing a MPM list for intra prediction according to any of the above described embodiments and exemplary implementations, reconstructing a current block in the image according to the mode indication as a pointer to the MPM list and the MPM list.

According to an embodiment, a method is provided for encoding an image including the steps of the method for constructing a MPM list for intra prediction according to any of the above described embodiments and exemplary implementations, determining a mode indication for the current block as a pointer into the MPM list, including the mode indication into an encoded bitstream.

According to an embodiment, an apparatus is provided for constructing a MPM list for intra prediction, the apparatus comprising processing circuitry configured to obtain an intra prediction mode of a first neighbor block adjacent to a current block, if the intra prediction mode of the first neighbor block is different from an intra prediction mode that has been obtained from a second neighbor block, determine the validity for the intra prediction mode, storing the intra prediction mode into a corresponding validity buffer out of several validity buffers according to the validity of the intra prediction mode, and fetch intra prediction modes from the several validity buffers into the MPM list, starting from the most valid buffer until the MPM list contains a maximum number of prediction modes or all the prediction modes that are stored in the validity buffers are fetched into the MPM list.

According to an embodiment, an apparatus is provided for constructing a MPM list for intra prediction, the apparatus comprising an intra mode determination unit (1610) configured to obtain an intra prediction mode of a first neighbor block adjacent to a current block, a validity determination unit (1620) configured to, if the intra prediction mode of the first neighbor block is different from an intra prediction mode that has been obtained from a second neighbor block, determine the validity for the intra prediction mode, a buffer access unit (1630) configured to store the intra prediction mode into a corresponding validity buffer out of several validity buffers according to the validity of the intra prediction mode, and an MPM construction unit (1640) configured to fetch intra prediction modes from the several validity buffers into the MPM list, starting from the most valid buffer until the MPM list contains a maximum number of prediction modes or all the prediction modes that are stored in the validity buffers are fetched into the MPM list.

For example, the validity value depends on at least one of the following whether or not the intra prediction mode is a directional mode, on which side of the current block the first neighboring block is located, direction of the intra prediction mode.

In some embodiments, the validity determination unit is configured to determine the validity for the intra prediction mode comprising, if the intra prediction mode is non directional, the validity is set to a value VALID_NON_DIR, if the first neighbor block is located to the left of the current block, and the intra prediction mode is greater or equal than HOR_IDX and the intra prediction mode is lesser than VER_IDX−ctThr, the validity is set to a value VALID_DIR, if neighboring block is located above of the current block, and the intra prediction mode is greater than HOR_IDX+ dblStrictThr and the intra prediction mode is lesser or equal than VER_IDX, the validity is set to VALID_DIR, wherein HOR_IDX is the index of a horizontal prediction mode, VER_IDX is the index of a vertical prediction mode, and dblStrictThr is a pre-configured threshold.

For instance, dblStrictThr is equal to 4.

In some embodiments, the validity for a first buffer of the several validity buffers $FIFO_0$ is VALID_DIR, validity for a second buffer of the several validity buffers $FIFO_1$ is VALID_NON_DIR which is lower than VALID_DIR.

For instance, the validity for the first neighbor block being the left or below left neighbor block is set to VALID_DIR, if the intra prediction mode is greater than −10 and is lesser than HOR_IDX, and/or if the intra prediction mode is equal to or greater than VER_IDX−strictThr and equal to or less than VER_IDX+strictThr, then the validity is set to a value STRICTLY_INVALID_DIR.

For example, the value STRICTLY_INVALID_DIR is lower than the value VALID_DIR and lower than the value VALID_NON_DIR.

In some embodiments, the validity for the first neighbor block being the above or above right neighbor block is set to VALID_DIR, if the intra prediction mode is greater than VER_IDX and is lesser than 76, and/or if the intra prediction mode is equal to or greater than HOR_IDX−strictThr and equal to or less than HOR_IDX+strictThr, then the validity is set to STRICTLY_INVALID_DIR.

In some embodiments, the validity for the first neighbor block being the above-left neighbor block is set to VALID_DIR, if the intra prediction mode is greater than HOR_IDX and is lesser than VER_IDX, and/or if the intra prediction mode is equal to or greater than VDIA_IDX−strictThr and equal to or less than 2+strictThr, then the validity is set to STRICTLY_INVALID_DIR.

For instance, the intra prediction mode is stored into the buffer having the same validity identification as determined for the intra prediction mode, it is checked whether VALID_DIR and VALID_NON_DIR buffers store the number of intra prediction modes that is equal or greater than the maximum MPM list size, and if the VALID_DIR and VALID_NON_DIR buffers store the number of intra prediction modes that is equal or greater than the maximum MPM list size, the MPM list is filled.

In some exemplary implementations, the buffer with validity of STRICTLY_INVALID_DIR is not used to populate the MPM list, and/or if the intra prediction mode has STRICTLY_INVALID_DIR validity, it is not pushed to any of the buffers.

For example, if the number of intra prediction modes stored in the buffers is less than the size of the MPM list, the vacant positions within the MPM list are filled by default modes.

According to an embodiment, an apparatus is provided for decoding (30) an image including a bitstream parsing unit for inferring from an encoded bitstream a mode indication, the apparatus for constructing a MPM list for intra prediction according to any of the above apparatuses, a reconstructing unit for reconstructing a current block in the image according to the mode indication as a pointer to the MPM list and the MPM list.

According to an embodiment, an apparatus for encoding an image including the apparatus for constructing a MPM list for intra prediction according to any of the above apparatuses, an intra-prediction unit for determining a mode indication for the current block as a pointer into the MPM list, a bitstream generator for including the mode indication into an encoded bitstream.

According to an embodiment, an integrated circuit embodying an apparatus according to any of embodiments and examples above.

According to an embodiment, a program product stored on a non-transitory computer-readable medium and comprising instructions which when executed on one or more processors cause the one or more processors to execute a method according to any of the above-described methods.

BRIEF DESCRIPTION OF DRAWINGS

The following embodiments are described in more detail with reference to the attached figures and drawings.

DETAILED DESCRIPTION

Definitions of Acronyms & Glossary

Figure 1:
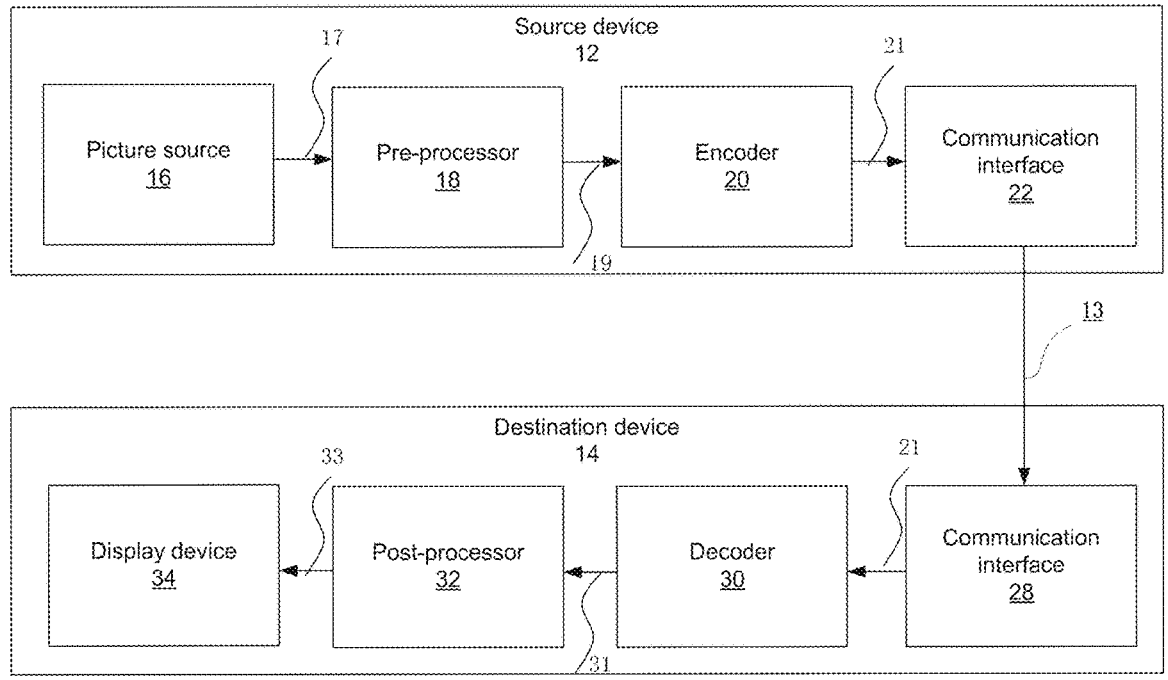
FIG. 1 is a block diagram showing an example of a video coding system configured to implement embodiments of the disclosure.

CTU/CTB—Coding Tree Unit/Coding Tree Block
CU/CB—Coding Unit/Coding Block

PU/PB—Prediction Unit/Prediction Block
TU/TB—Transform Unit/Transform Block
HEVC—High Efficiency Video Coding Video coding schemes such as H.264/advanced video coding (AVC) and HEVC are designed along the successful principle of block-based hybrid video coding. Using this principle a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the disclosure are described herein in reference to HEVC or the reference software of VVC, developed by the Joint Collaboration Team on Video Coding (JCT-VC) of ITU-T VCEG and ISO/IEC MPEG. One of ordinary skill in the art will understand that embodiments of the disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called CUs, and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the JVET to evaluate compression technology designs proposed by their experts in this area.

The VTM uses 35 Intra modes whereas the BMS uses 67 Intra modes. To code the 67 intra modes, the current intra mode coding scheme in BMS uses the following method.

To accommodate the increased number of directional Intra modes in BMS, an Intra mode coding method with 6 MPMs is used. Two major technical aspects are involved.
1) the derivation of 6 MPMs, and
2) entropy coding of 6 MPMs and the remaining non-MPMs modes.

In BMS, the modes included into the MPM lists are classified into three groups as follows Neighbor intra modes, Derived intra modes, and Default intra modes.

Figure 5:
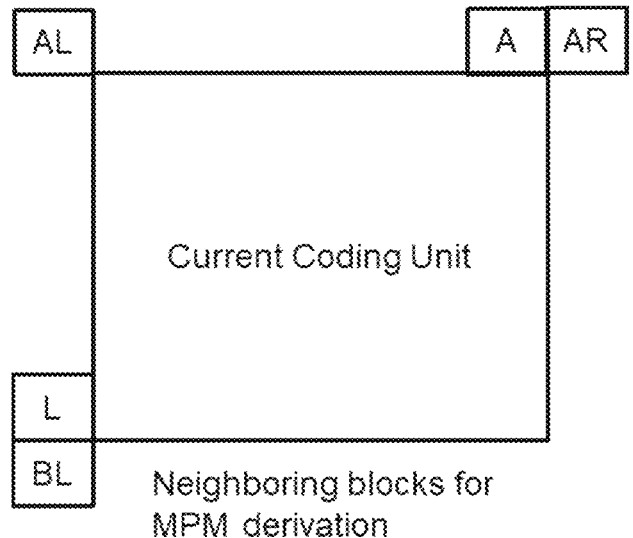
FIG. 5 shows a schematic diagram illustrating neighboring blocks for MPM derivation.
Figure 6:
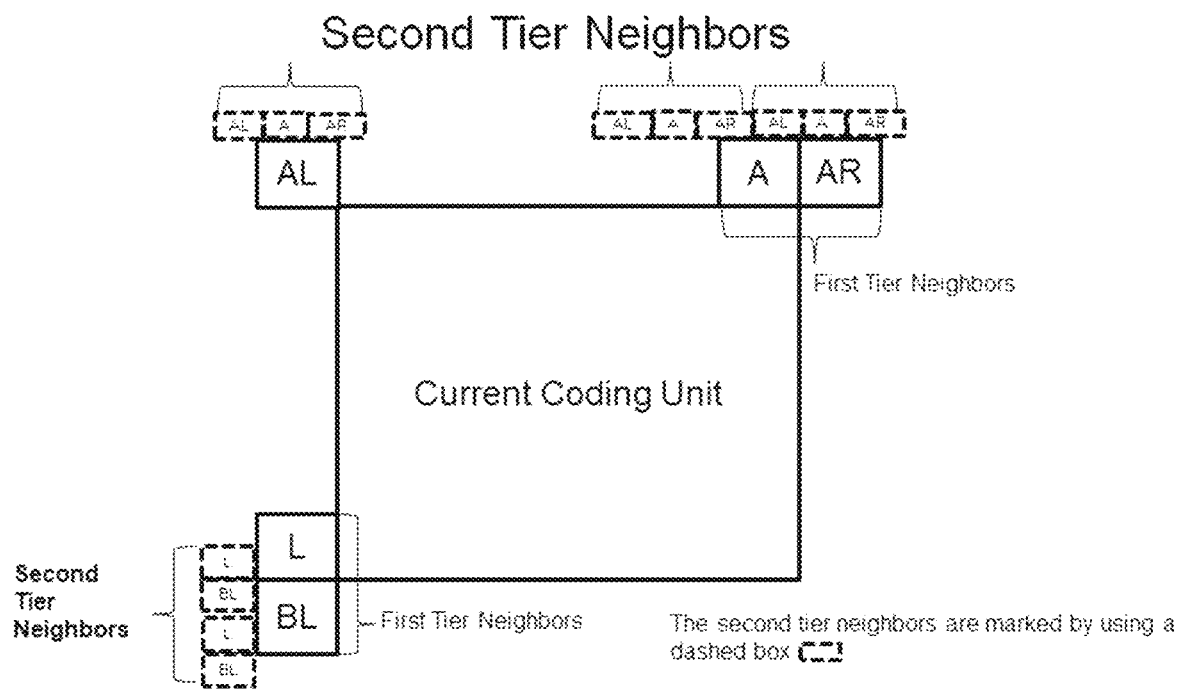
FIG. 6 shows a schematic diagram illustrating second tier neighboring blocks intra modes used for deriving the first three modes in remaining modes list.

Five neighboring intra prediction modes (i.e. intra prediction modes of the neighboring blocks) are used to form the MPM list for a current block. Those locations of the 5 neighboring blocks are the same as those used in the merge mode, i.e., left (L), above (A), below left (BL), above right (AR), and above left (AL) as shown in FIG. 5. For example, the left block (L) may be defined as the block which includes the sample neighboring on the left hand side the bottom-left corner sample of the current block (current CU). The above block (A) may be defined as the block which includes the sample neighboring on the top the top-right corner sample of the current block. Similarly, the BL block includes the sample which is diagonally (in bottom-left direction) adjacent to the bottom-left corner sample of the current block. The AL block includes the sample which is diagonally (in top-left direction) adjacent to the top-left corner sample of the current block. The AR block includes the sample which is diagonally (in top-right direction) adjacent to the top-right corner sample of the current block. It is noted that the L, A, BL, AL, AR blocks may in general have different sizes, depending on the partitioning mode of the neighboring left, bottom-left, top, and/or top-right blocks.

An initial MPM list is formed by inserting 5 neighbor intra modes mentioned above, and then planar, and direct current (DC) modes into the MPM list. A pruning process is used to remove the duplicated modes so that only unique modes are included into the MPM list. In other words, each intra-mode is listed only once in the MPM list. The order in which the initial modes are included is left, above, planar, DC, below left, above right, and above left.

Figure 4:
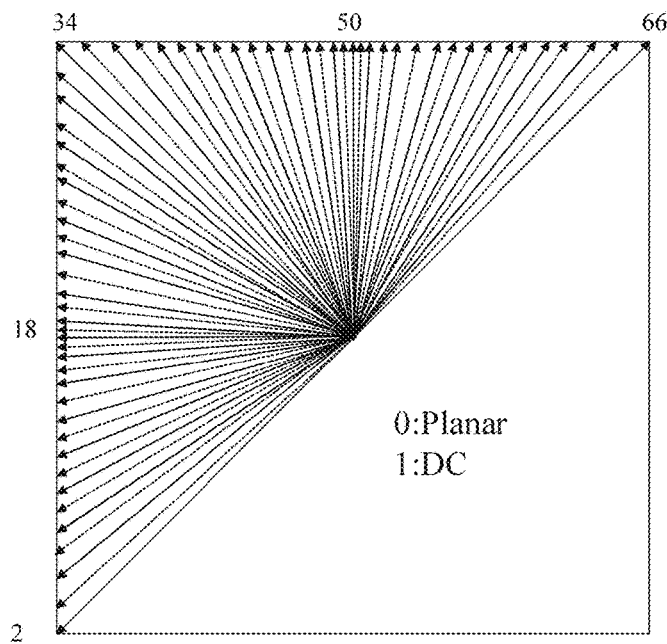
FIG. 4 shows a schematic diagram illustrating proposed 67 intra prediction modes.

If the MPM list is not full (i.e. has less than 6 MPMs candidates in the list), derived modes are added. Those intra modes are obtained by adding −1 or +1 to the angular modes which are already included in the MPM list. Derivation is not applied to non-angular modes, i.e. DC or planar. Exemplary angular modes are illustrated in FIG. 4. Diagonal mode (DIA_IDX) in bottom-left direction has index 2, horizontal mode (HOR_IDX) has index 18, top-left DIA_IDX has index 34, vertical mode (VER_IDX) has index 50 and the top-right DIA_IDX has index 66. The additional candidate modes for the MPM list are then derived by adding the +1 or −1 (in general, any predefined offset) to the intra mode index of the angular modes in the MPM list. For example, if candidate mode with index 34 is already in the MPM, spare positions in the MPM may be filled with the mode 35 and/or 33.

Finally, if the MPM list is still not complete, the default modes are added in the order of vertical, horizontal, intra mode 2, and DIA_IDX. As a result of this process, a unique list of 6 MPM modes is generated.

For entropy coding of the 6 MPMs, a truncated unary binarization of the MPMs is used. The first three bins are coded with contexts which depend on the MPM mode related to the bin currently being signaled. The MPM mode is classified into one of three categories according to (a) whether the mode belongs to horizontal (MPM mode is less than or equal to a diagonal direction), (b) vertical (MPM mode greater than the diagonal direction), or (c) non-angular (DC and planar) class. Accordingly, three contexts are used to signal the MPM index.

The coding of the remaining 61 non-MPMs is done as follows. The 61 non-MPMs are firstly divided into two sets selected modes set and non-selected modes set. The selected modes set contains 16 modes and the rest (45 modes) are assigned to the non-selected modes set. The mode set that the current mode belongs to is indicated in the bitstream with a flag. Then, the mode from the selected set is signaled with a 4-bit fixed-length code, and the mode from the non-selected set is coded with a truncated binary code. The selected modes set is generated by sub-sampling the total 61 non-MPMs with indexes as follows:

Selected modes set={0, 4, 8, 12, 16, 20 . . . 60}
Non-selected modes set={1, 2, 3, 5, 6, 7, 9, 10 . . . 59}.

The summary of the different INTRA mode signaling mechanisms is shown in Table 1.

TABLE 1

Current LUMA Intra mode signaling in BMS

| Intra prediction modes | MPM flag | Selected flag | Bin string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

It is noted that the present disclosure is not limited to any particular size of the MPM list. Moreover, the remaining intra modes not entered into the MPM list may be separated into further sets (such as selected and non-selected, or more than these), but do not have to be separated any further. In another example, an Intra mode coding method with 3 MPMs is used. In an example, a syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered prediction block relative to the top-left luma sample of the picture. When intra_luma_mpm_flag[x0][y0] is equal to 1, the intra prediction mode is inferred from a neighboring intra-predicted PU.

Intra prediction for current block (IntraPredModeY[xPb][yPb]) is derived by the following ordered steps.

The neighboring locations (xNbA, yNbA) and (xNbB, yNbB) are set equal to (xPb−1, yPb) and (xPb, yPb−1), respectively.

For X being replaced by either A or B, the variables candIntraPredModeX are derived as follows.

The availability derivation process for a block is invoked with the location (xCurr, yCurr) set equal to (xPb, yPb) and the neighboring location (xNbY, yNbY) set equal to (xNbX, yNbX) as inputs, and the output is assigned to availableX.

The candidate intra prediction mode candIntraPredModeX is derived as follows:
If one or more of the following conditions are true, candIntraPredModeX is set equal to INTRA_DC.
The variable availableX is equal to FALSE.
CuPredMode[xNbX][yNbX] is not equal to MODE_INTRA.
X is equal to B and yPb−1 is less than ((yPb>>CtbLog2SizeY)<<CtbLog2SizeY).
Otherwise, candIntraPredModeX is set equal to IntraPredModeY[xNbX][yNbX].
The candModeList[x] with x=0 . . . 2 is derived as follows:
If candIntraPredModeB is equal to candIntraPredModeA, the following applies:
If candIntraPredModeA is less than 2 (i.e., equal to INTRA_PLANAR or INTRA_DC),
candModeList[x] with x=0 . . . 2 is derived as follows:
candModeList[0]=INTRA_PLANAR
candModeList[1]=INTRA_DC
candModeList[2]=INTRA_ANGULAR50
Otherwise, candModeList[x] with x=0 . . . 2 is derived as follows:
candModeList[0]=candIntraPredModeA
candModeList[1]=2+((candIntraPredModeA+61) % 64)
candModeList[2]=2+((candIntraPredModeA−1) % 64)
Otherwise (candIntraPredModeB is not equal to candIntraPredModeA), the following applies:
candModeList[0] and candModeList[1] are derived as follows:
candModeList[0]=candIntraPredModeA
candModeList[1]=candIntraPredModeB
If neither of candModeList[0] and candModeList[1] is equal to INTRA_PLANAR,
candModeList[2] is set equal to INTRA_PLANAR,
Otherwise, if neither of candModeList[0] and candModeList[1] is equal to INTRA_DC,
candModeList[2] is set equal to INTRA_DC,
Otherwise, candModeList[2] is set equal to INTRA_ANGULAR50.
IntraPredModeY[xPb][yPb] is derived by applying the following procedure:
If intra_luma_mpm_flag[xPb][yPb] is equal to 1, the IntraPredModeY[xPb][yPb] is set equal to candModeList[intra_luma_mpm_idx[xPb][yPb]].
Otherwise, IntraPredModeY[xPb][yPb] is derived by applying the following ordered steps:
The array candModeList[x], x=0 . . . 2 is modified by the following ordered steps:
When candModeList[0] is greater than candModeList[1], both values are swapped as follows:
(candModeList[0], candModeList[1])=Swap(candModeList[0], candModeList[1])
When candModeList[0] is greater than candModeList[2], both values are swapped as follows:
(candModeList[0], candModeList[2])=Swap(candModeList[0], candModeList[2])
When candModeList[1] is greater than candModeList[2], both values are swapped as follows:
(candModeList[1], candModeList[2])=Swap(candModeList[1], candModeList[2]) (8-11)

IntraPredModeY[xPb][yPb] is derived by the following ordered steps:
IntraPredModeY[xPb][yPb] is set equal to intra_luma_mpm_remainder[xPb][yPb].
For i equal to 0 to 2, inclusive, when IntraPredModeY[xPb][yPb] is greater than or equal to candModeList[i], the value of IntraPredModeY[xPb][yPb] is incremented by one.

In one implementation form of the present application, a frame is same as a picture.

In one implementation form of the present application, a method for constructing a MPM list for intra prediction, the method comprising obtaining an intra prediction mode of a neighbor block adjacent to a current block, if the intra prediction mode of the neighbor block is not included (or comprised) in the MPM list and the intra prediction mode of the neighbor block is a directional (for example, angular) intra prediction mode, determining a quantity N of predicted samples of the current block according to positions of a set of reference samples on a boundary of the current block, wherein N is an integer, if the N is greater than or equal to a threshold (for example, a first threshold), adding the intra prediction mode of the neighbor block into the MPM list.

It is noted that the determining of the quantity N of predicted samples may be determining by estimation or by fetching N from a look-up table, e.g. depending on the intra mode index and, possibly, considering availability of the reference pixels. In this way, a mode is included into the MPM list only if it is capable of predicting certain number of samples of the current block (e.g. those exceeding a first threshold).

According to the implementation form of the application, the order of intra prediction mode derived from neighbor block in the MPM list is determined by the impact of the samples of block. For instance, derived intra prediction mode candidates with higher N are included before including derived intra prediction mode candidates with lower N.

According to the implementation form of the application, the order of intra prediction mode derived from neighbor block is determined by the validity of the intra prediction mode for the prediction of the current block. Here, the term "order" refers to the order in which particular intra prediction mode candidates are considered for the construction of the MPM list. In general, it is desired that a prediction mode candidate is capable of predicting possibly large parts of the current block. There may be intra prediction mode candidates which cannot predict any sample or a negligibly small number of samples. This may be for example the case for angular modes, which have a direction for which no reference samples are available. In order to enable sorting of the intra prediction mode candidates according to their relevance for predicting the current block, the present disclosure categorizes the intra prediction mode candidates according to their validity. Here, the validity may reflect (indicate) the applicability of a particular intra prediction mode for predicting samples of the current block. The applicability correlates with the amount of samples (area of the current block) of the current block predictable by the intra prediction mode.

Figure 14:
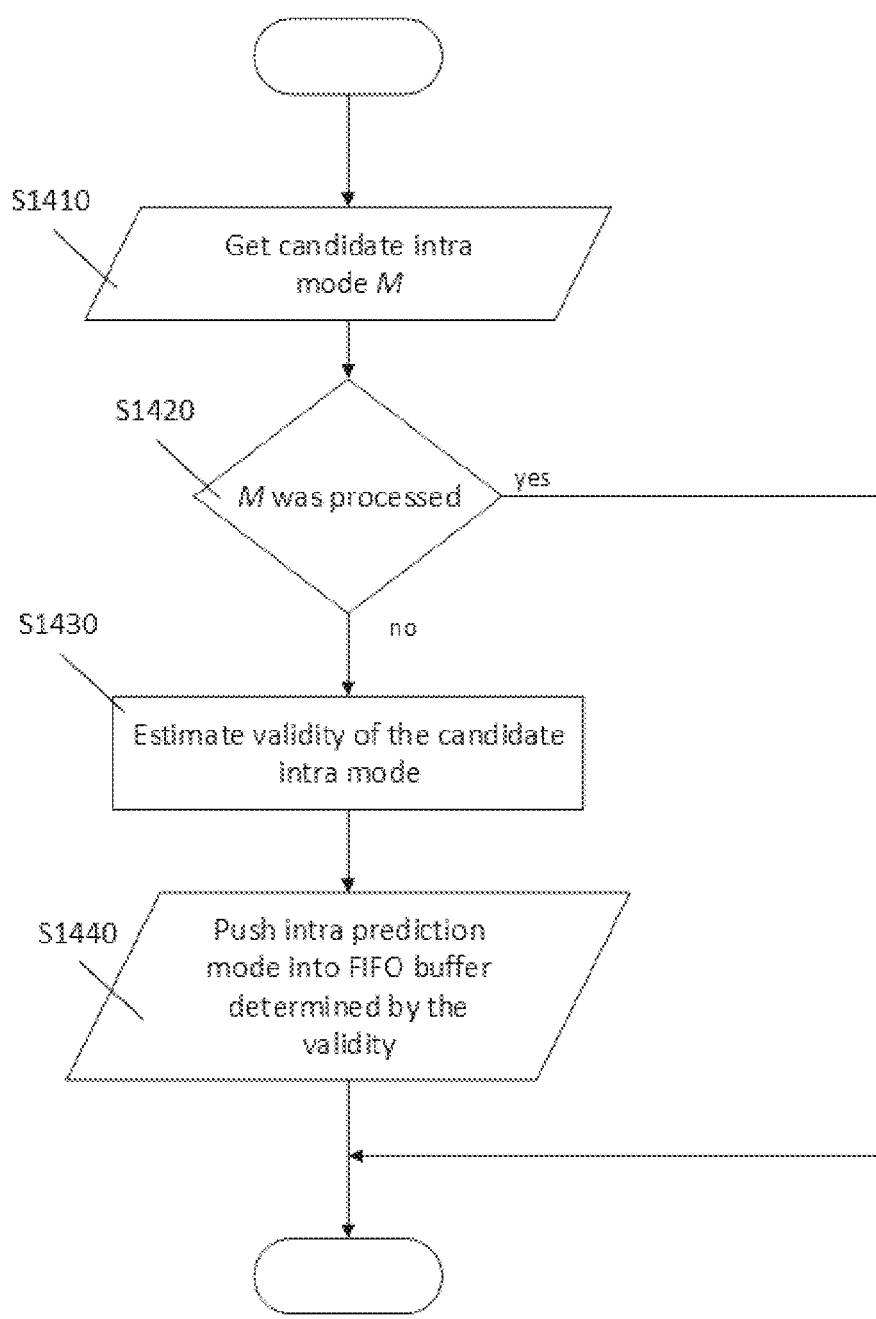
FIG. 14 is a flow diagram illustrating an exemplary method for providing one or more validity buffers.

The steps of a method to determine the validity are shown in exemplary FIG. 14 and are as following.

Step one S1410 obtaining an intra prediction mode of a neighbor block adjacent to a current block. In this step, candidate intra prediction mode may be obtained from the memory where the intra prediction modes of previously processed blocks (CUs) are stored. For example, if the typical processing order from left to right and from top to bottom is adopted, manly the left and top adjacent blocks and their intra prediction modes will be available. The neighbor blocks may be determined according to a predetermined order known at the encoder and at the decoder.

Step two S1420 checking whether the intra prediction mode has been already obtained from another neighbor blocks. This step could be performed by the means of a register, each bit of this register is a flag indicating whether the intra prediction mode was obtained or not. After mode is successfully obtained, the corresponding bit in this register is set to 1. The check during obtaining intra prediction mode is successful if the value of corresponding bit equal is equal to 0. This step belongs to pruning. The aim is to ensure that any intra prediction mode candidate is lister only once in the MPM list and/or in a temporary list or buffer.

Step three determine S1430 validity of the candidate intra mode. The validity of the candidate intra prediction mode may be estimated based on one or more (or all) of the following rules. If the intra prediction mode is non directional, the validity is set to VALID_NON_DIR, i.e. "Valid, non-directional". If neighboring block is located to the left of the current one, and the intra prediction mode is greater or equal than HOR_IDX and the intra prediction mode is lesser than VER_IDX−dblStrictThr, the validity is set to VALID_DIR ("Valid, directional"). If neighboring block is located above of the current one, and the intra prediction mode is greater than HOR_IDX+dblStrictThr and the intra prediction mode is lesser or equal than VER_IDX, the validity is set to VALID_DIR. dblStrictThr is a threshold, that is predefined. In particular embodiments it could be set equal to 4. The predefinition may correspond to definition in standard. However, the threshold may also have a different value or be configurable, e.g. in the bitstream or derivable based on standardized or otherwise known manner at both the encoder and the decoder. The threshold may depend on the size of the current block and/or based on the number of intra modes configurable for the current block.

For the left and below left neighboring block ("L" and "BL" shown in FIG. 5) validity is set to VALID_DIR, if the intra prediction mode is greater than −10 (see FIG. 13) and is lesser than HOR_IDX. If the intra prediction mode is equal to or greater than VER_IDX−strictThr and equal to or less than VER_IDX+strictThr, then the validity is set to STRICTLY_INVALID_DIR. Otherwise, the validity is set to INVALID_DIR. The invalidity corresponds to the fact that L and BL block with such intra prediction modes are predicted along direction which does not cut the current block and thus, they do not likely lead to an accurate prediction.

For the above and above right neighboring block ("A" and "AR" shown in FIG. 5) validity is set to VALID_DIR, if the intra prediction mode is greater than VER_IDX and is lesser than 76. If the intra prediction mode is equal to or greater than HOR_IDX−strictThr and equal to or less than HOR_IDX+strictThr, then the validity is set to STRICTLY_INVALID_DIR. Otherwise, the validity is set to INVALID_DIR.

For the above-left neighboring block ("AL" shown in FIG. 5) validity is set to VALID_DIR, if the intra prediction mode is greater than HOR_IDX and is lesser than VER_IDX. If the intra prediction mode is equal to or greater than VDIA_IDX−strictThr and equal to or less than 2+strictThr, then the validity is set to STRICTLY_INVALID_DIR. Otherwise, the validity is set to INVALID_DIR.

Figure 13:
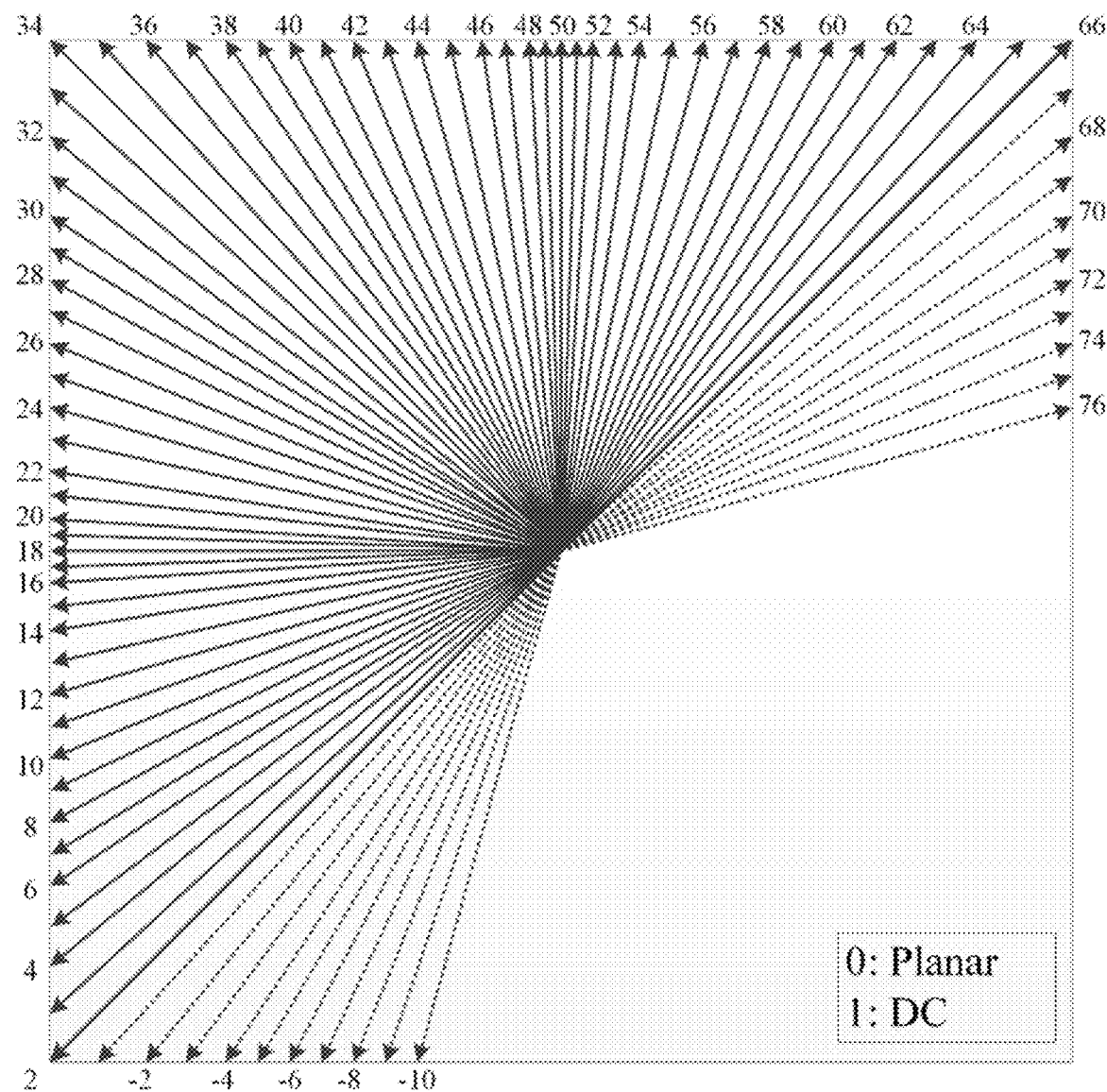
FIG. 13 shows a schematic diagram illustrating proposed 85 intra prediction modes.

It is noted that the above-mentioned example referred to intra prediction modes as shown in FIG. 13, numbered from −10 to 76. However, the present disclosure is not limited thereto, there may be different number of modes and different numbering/labeling of them (see also FIGS. 4 and 7). In general, given a neighbor block location, VALID_DIR may correspond to the direction between the neighbor block location and the center of the current block plus/minus a certain range. The range may be for instance π/4. However, the range may be smaller or larger, e.g. π/3 or π/5. STRICTLY_INVALID_DIR may correspond to a narrow interval around the vertical or horizontal direction for neighbor blocks located at the corners/ends of sides of the current block. For the left (or right) neighbors, a narrow interval around the vertical direction belong to STRICTLY_INVALID_DIR. For the top (or bottom) neighbors, a narrow interval around the horizontal direction may belong to STRICTLY_INVALID_DIR. The narrow interval here corresponds to strictThr, which may be approximately π/16, π/18 or less. The remaining modes may be identified as INVALID_DIR.

Step four S1440 push (store) intra prediction mode into a fist-in first-out (FIFO) buffer in accordance with the validity determined at step three. In a particular embodiment, several buffers could be present (configured), identified as VALID_NON_DIR, i.e. "Valid, non-directional", VALID_DIR, i.e. "Valid, directional", INVALID_DIR, i.e. "Invalid, directional", STRICTLY_INVALID_DIR, i.e. "Strictly invalid, directional". The intra prediction mode obtained at step one is pushed into the FIFO having the same validity identification as determined for the obtained intra prediction mode in the step three S1430. At this step, it could be checked whether VALID_DIR and VALID_NON_DIR FIFOs store the number of intra prediction modes that is equal or greater than maximum MPM list size. If this condition is fulfilled, validity determination procedure is complete. It is noted that the term "buffer" here may be any portion of a memory, in general, storage for storing therein the modes. The buffers may have predefined size or may be of configurable size. FIFO is merely an example. In general, the buffer may implement any access strategy.

In an additional embodiment, step four may not use FIFO with validity of STRICTLY_INVALID_DIR. If the intra prediction mode determined at the previous step has STRICTLY_INVALID_DIR validity, it is not pushed to any of the FIFOs and step five is performed. Further embodiments and variations are possible. For example, there may be more or less buffers corresponding to more or less respective prediction direction sets.

Otherwise, step five is fulfilled, that consists in repeating the previous steps S1410 to S1440 for each candidate intra prediction mode and, once all candidate intra prediction modes of the current block were processed, the steps are repeated for the next neighbor block.

Figure 15:
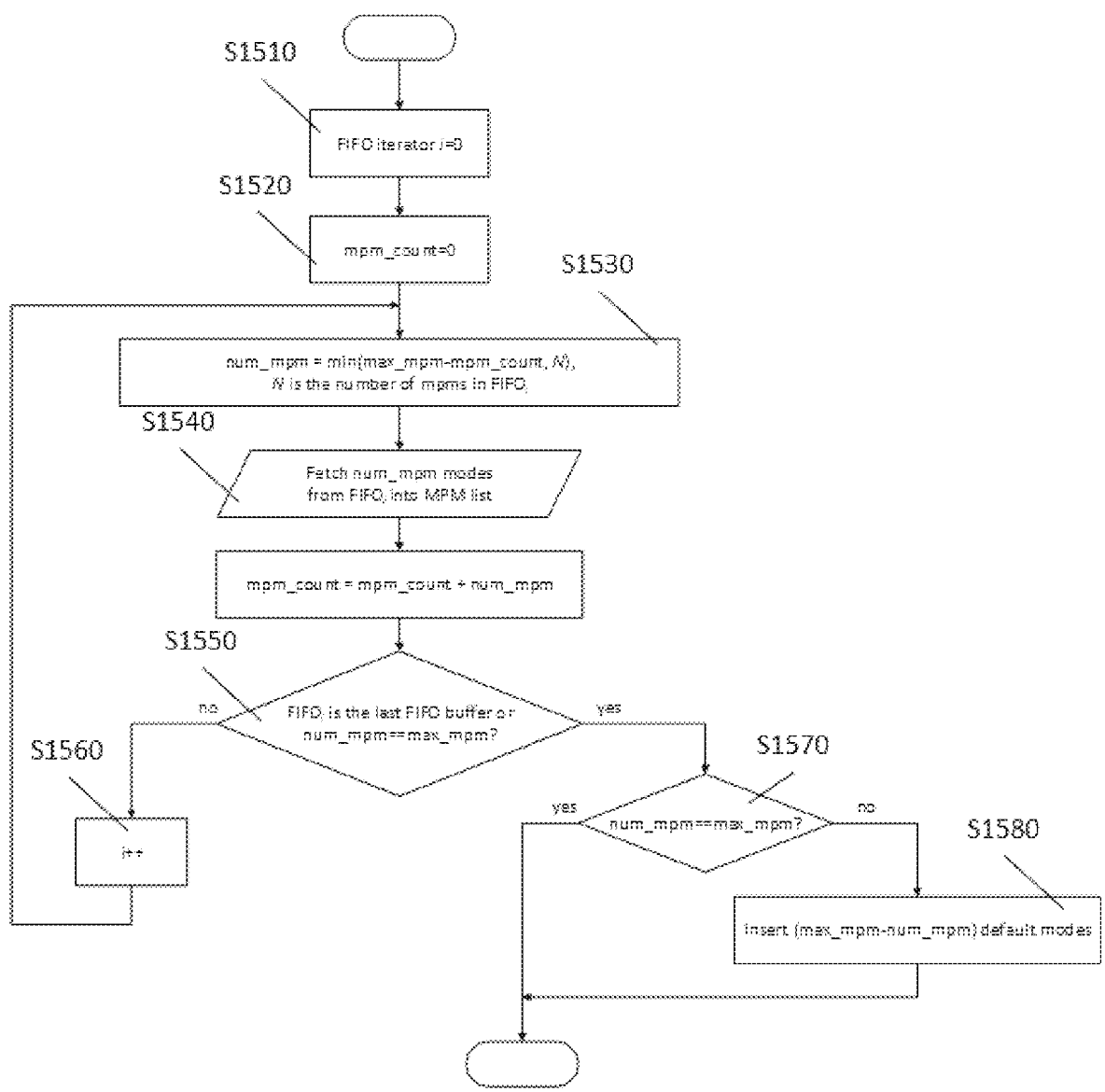
FIG. 15 is a flow diagram illustrating an exemplary method for constructing an MPM list.

After determining validity, the steps according to FIG. 15 are performed. In this example, validity for $FIFO_0$ is VALID_DIR. Validity for $FIFO_1$ is VALID_NON_DIR. Validity for $FIFO_2$ is INVALID_DIR. In other words, the higher the validity, the buffer index. As the result of these steps, MPM list is populated from the FIFO buffers. If the number of intra prediction modes stored in the FIFO buffers is less than the size of the MPM list, the vacant positions within this list are filled by default modes.

In particular, in step S1510, the index i of the buffer is initialized to 0, i.e. to the buffer storing most valid intra prediction modes. In step S1520, the mpm_count is initialized to 0, too. The variable mpm_count has a value corresponding to the count of the MPM entries in the MPM list and ranges from 0 to maximum number of entries of the MPM list denoted as max_mpm. In step S1530, it is calculated with how many intra prediction modes from the current (i.e. in current iteration given by i) buffer, $FIFO_i$ the MPM list is filled. In particular, num_mpm modes from $FIFO_i$ are stored as entries of the MPM list. The variable num_mpm is given as follows:

num_mpm=min(max_mpm−mpm_count,N), with N being the number of intra prediction modes in the current $FIFO_i$. In other words, in iteration i, either all the $FIFO_i$ entries (N) or as many entries as are still free in the MPM list (max_mpm−mpm_count) are stored in the MPM list, whichever of the two is smaller. In step S1540, the MPM list is filled with the modes from the current $FIFO_i$. In particular, the calculated (in step S1530) num_mpm modes are fetched from $FIFO_i$ and stored into the MPM list. The variable capturing current length of the MPM list, mpm_count is updated by the number of the entered modes:

mpm_count=mpm_count+num_mpm.

In step S1550 it is evaluated (judged):
Condition 1: whether or not the MPM list is full (num_mpm==max_mpm) and
Condition 2: whether or not the current $FIFO_i$ is the last buffer to be used to fill the MPM list.

If neither condition 1 nor condition 2 is fulfilled ("no" in step S1550), in step S1560 the iteration index i is incremented and the following buffer (with the next lower validity) is processed as described above in steps S1530 and further.

If condition 1 or condition 2 is fulfilled ("yes" in step S1550) and, in particular, if condition 1 is fulfilled in the evaluation in step S1570 ("yes" in step S1570), the procedure terminates, since the MPM list is full. If, on the other hand, in step S1570 condition 1 is not fulfilled ("no" in step S1570), this means that condition 2 is fulfilled and there are no further buffers from which the modes can be stored into the MPM list. Correspondingly, in step S1580, the MPM list is filled with default modes. In particular, max_mpm−num_mpm default modes are inserted into the MPM list. Then the procedure terminates. In other words, according to an embodiment, a method is provided for constructing a MPM list for intra prediction. The method comprises obtaining an intra prediction mode of a neighbor block adjacent to a current block, if the intra prediction mode of the neighbor block was not obtained for another neighbor block determine the validity for this intra prediction mode, push the intra prediction mode into a FIFO buffer that is determined according to the validity of intra prediction mode, and fetch intra prediction modes from FIFOs into the MPM list, starting from the most valid FIFO until MPM list contain the maximum number of MPM lists or all the modes that are stored in FIFO are fetched into MPM list. In some implementations, in the method, validity for $FIFO_0$ is VALID_DIR, validity for $FIFO_1$ is VALID_NON_DIR.

Figure 16:
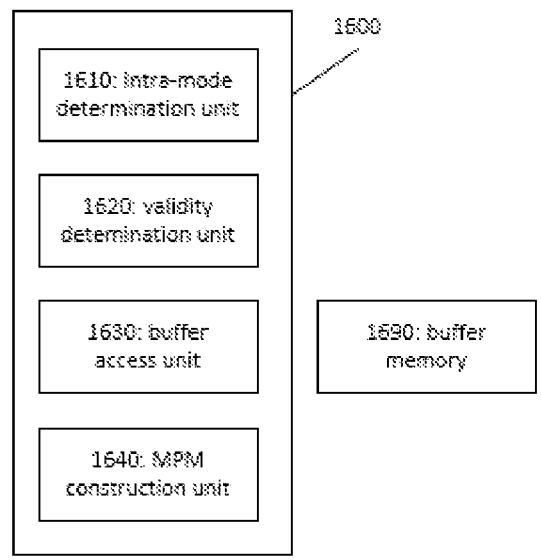
FIG. 16 is a block diagram schematically illustrating functional structure of an apparatus according to embodiments of the present disclosure.

FIG. 16 shows an exemplary apparatus 1600 according to an embodiment. The apparatus 1600 serves for constructing a MPM list for intra prediction. It comprises an intra mode determination unit 1610 configured to obtain an intra prediction mode of a first neighbor block adjacent to a current block. This may be performed, for instance by fetching the intra prediction mode from a memory in which the prediction modes of previously processed blocks (with respect to the current block) are stored. The apparatus 1600 further comprises a validity determination unit 1620 configured to, if the intra prediction mode of the first neighbor block is different from an intra prediction mode that has been obtained from a second neighbor block, determine the validity for the intra prediction mode. In other words, in validity determination unit, the validity of the intra prediction mode of neighboring blocks is determined. As mentioned above, the validity is evaluated based on the direction of the intra prediction mode of the neighbor block in relation to the position of the neighbor block relative to the current block. The validity does not have to be determined if the intra prediction mode of the neighbor block is already included in one of the validity buffers. In other words, a pruning step may be performed before performing the validity determination, which is reflected to the condition "if the intra prediction mode of the first neighbor block is different from an intra prediction mode that has been obtained from a second neighbor block". In this condition, the second block is any block for which the intra prediction mode was determined. It may be the blocks, of which the intra prediction mode is already in the blocks of which the MPM is already in one of the validity buffers. However, the present disclosure is not limited to performing this pruning step before determining the validity. The pruning step may be alternatively performed after the determination of the validity before the intra prediction mode is inserted into the appropriate validity buffer, or it may be performed when filling the MPM list from the validity buffer(s).

The apparatus further comprises a buffer access unit 1630 configured to store the intra prediction mode into a corresponding validity buffer out of several validity buffers (e.g. buffers in a buffer memory 1690 which may be intern or extern to the apparatus 1600) according to the validity of the intra prediction mode and an MPM construction unit 1640 configured to fetch intra prediction modes from the several validity buffers into the MPM list, starting from the most valid buffer until the MPM list contains a maximum number of prediction modes or all the prediction modes that are stored in the validity buffers are fetched into the MPM list. In other words, there may be several (i.e. at least more than one) validity categories (values) defined such as the above mentioned valid non-directional, strictly valid angular (directional), valid angular (directional), invalid, strictly invalid, or the like. For at least a subset (one or more) of these categories there are respective validity buffers, for instance a first buffer for the valid directional intra prediction modes and/or for valid non-directional. When constructing the MPM list, the intra prediction modes from the validity buffers are stored into the MPM list in the order of the buffers according to their validity (i.e. validity of the modes the respective buffers are storing).

It is noted that the above apparatus description is not to limit the disclosure, but merely exemplary. The apparatus may be implemented as a part of circuitry including one or more processors or other processing hardware as well as the corresponding software. In an embodiment, the above apparatus is embedded on an integrated circuit, e.g. on chip. The integrated circuit may perform further function such as encoding or decoding of video.

Figure 17:
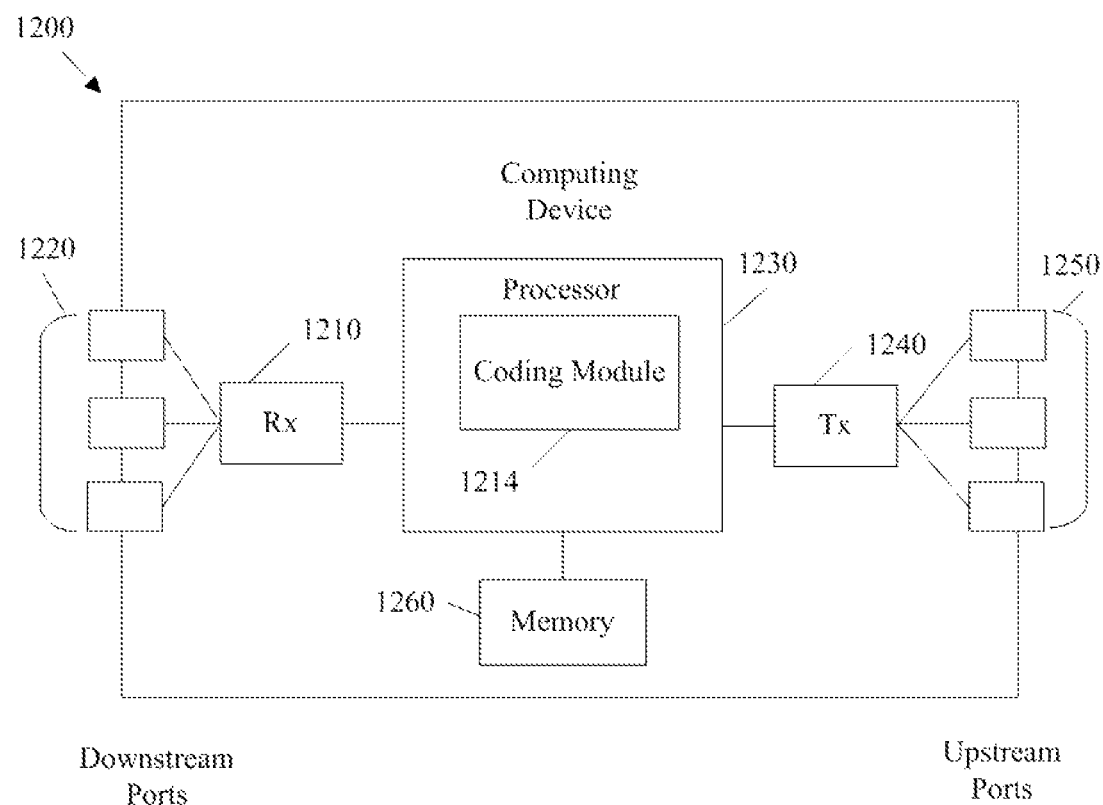
FIG. 17 is a schematic diagram of a computing device for video coding including the MPM construction list according to embodiments of the present disclosure.

FIG. 17 is a schematic diagram of an example computing device 1200 for video coding according to an embodiment of the disclosure. The video coding may be video encoding and/or video decoding which employs the above-described MPM construction. The computing device 1200 is suitable for implementing the disclosed embodiments as described herein. The computing device 1200 comprises ingress ports 1220 and receiver units (Rx) 1210 for receiving data, a processor, logic unit, or central processing unit (CPU) 1230 to process the data, transmitter units (Tx) 1240 and egress ports 1250 for transmitting the data, a memory 1260 for storing the data. The computing device 1200 may also comprise optical-to-electrical (OE) components and electrical-to-optical (EO) components coupled to the ingress ports 1220, the Rx 1210, the Tx 1240, and the egress ports 1250 for egress or ingress of optical or electrical signals. The computing device 1200 may also include wireless transmitters and/or receivers in some examples.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1220, Rx 1210, Tx 1240, egress ports 1250, and memory 1260. The processor 1230 comprises a coding module 1214. The coding module 1214 implements the disclosed embodiments described above. For instance, the coding module 1214 implements, processes, prepares, or provides the various coding operations. The inclusion of the coding module 1214 therefore provides a substantial improvement to the functionality of the computing device 1200 and effects a transformation of the computing device 1200 to a different state. Alternatively, the coding module 1214 is implemented as instructions stored in the memory 1260 and executed by the processor 1230 (e.g., as a computer program product stored on a non-transitory medium).

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random-access memory (RAM), ternary content-addressable memory (TCAM), and/or static random-access memory (SRAM). The computing device 1200 may also input/output (I/O) device for interacting with an end user. For example, the computing device 1200 may include a display, such as a monitor, for visual output, speakers for audio output, and a keyboard/mouse/trackball, etc. for user input.

It could be understand that in one implementation of the present application, the step obtaining an intra prediction mode of a neighbor block means that obtaining a value corresponding to the intra prediction mode applied to the neighbor block, or the step of adding an intra prediction mode into the MPM list means adding a value corresponding to the intra prediction mode into the MPM list.

In one implementation form of the present application, wherein the determining a quantity N of predicted samples of the current block according to positions of a set of reference samples on a boundary of the current block, comprises determining a plurality of samples comprised in the neighbor block as the set of reference samples, determining the quantity N according to the positions of the set of reference samples. It is noted that in some exemplary implementations, the set or reference samples may depend on one or more of size of the current block, number or samples of neighboring blocks which are available as reference samples (i.e. are within the picture/slice and/or allowed to be used for intra prediction, are already processed).

In one implementation form of the present application, the determining a quantity N of predicted samples of the current block according to positions of a set of reference samples on a boundary of the current block, comprises determining a side of the current block according to the relative position between the current block and the neighbor block, determining a plurality of samples adjacent to the side of the current block as the set of reference samples (for example, If the neighbor block is adjacent to the top side (e.g. "A" or "AR") of the current predicted block, available (i.e. non-padded) reference samples of the top side are included into the set of reference samples. If the neighbor block is adjacent to the left side (e.g. "L" or "BL") of the current predicted block, available (non-padded) reference samples of the left side are included into the set of reference samples. For the "AL" neighboring block available reference samples of the both sides are used in the similar manner), determining the quantity N according to the positions of the set of reference samples.

In one implementation form of the present application, the determining a quantity N of predicted samples of the current block according to positions of a set of reference samples on a boundary of the current block, comprises, if the absolute difference between a value corresponding to the intra prediction mode of the neighbor block and a value corresponding to an intra prediction mode of another neighbor block adjacent to the current block is less than another threshold (for example, a second threshold), determining a plurality of samples comprised in the another neighbor block and a plurality of samples comprised in the neighbor block as the set of reference samples, determining the quantity N according to the positions of the set of reference samples.

In one implementation form of the present application, the threshold (first threshold) is predefined, and a value of the threshold (first threshold) is equal to 2, 4, 8 or 16.

In one implementation form of the present application, the threshold (first threshold) is determined according to a quantity of samples in the current block (for example, the value of the threshold is equal to ½, ¼, ⅛ or any other fractional part of the total number of the samples of the current block) This includes implementations in which the quantity N is determined based on the block size, e.g. given by the size of its side (if the block is square) or two sides (if the block is rectangular but not square).

In one implementation form of the present application, the method further comprises, after adding the intra prediction mode of the neighbor block into the MPM list, if a quantity of intra prediction modes comprised in the MPM list is less than another threshold (for example, a third threshold), checking whether a first intra prediction mode of a set of intra-prediction modes is comprised in the MPM list, and add the first intra-prediction mode to the MPM list if the first intra-prediction mode is not comprised in the MPM list, wherein the set of intra prediction modes comprises a planar mode (0), a DC mode (1), a VER_IDX, a HOR_IDX, an intra mode 2 (2), a vertical diagonal mode (VDIA_IDX) or a DIA_IDX. Here, when referring to FIG. 4, VDIA_IDX may correspond to index value 66 and DIA_IDX may correspond to index value 34.

In one implementation form of the present application, the method further comprises, if N is less than a threshold (for example, a first threshold), the intra prediction mode of the neighbor block is not added into the MPM list at this process.

In one implementation form of the present application, the method further comprises, if N is less than a threshold (for example, a first threshold), adding the intra prediction mode of the neighbor block into the last part of the MPM list (for example, in the case of 3MPM, the intra prediction mode of the neighbor block is added into the third position in the MPM list, in the case of 6 MPM, the intra prediction mode of the neighbor block is added into the fifth or sixth position in the MPM list).

In one implementation form of the present application, a method for constructing a MPM list for intra prediction is provided, the method comprising obtaining an intra prediction mode of a neighbor block adjacent to a current block, if the intra prediction mode of the neighbor block is not comprised in the MPM list and the intra prediction mode of the neighbor block is a directional (for example, angular) intra prediction mode, determining, according to the neighbor block, whether a quantity of predicted samples of the current block is greater than or equal to a threshold or not, if the quantity of predicted samples of the current block is greater than or equal to the threshold, adding the intra prediction mode of the neighbor block into the MPM list. Here, the quantity may be any counted or estimated or otherwise determined number (amount) of samples of the current block to be predicted with the intra prediction mode.

In one implementation form of the present application, the method further comprises, after adding the intra prediction mode of the neighbor block into the MPM list, if a quantity of intra prediction modes comprised in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra prediction modes comprises a planar mode (0), a DC mode (1), a VER_IDX, a HOR_IDX, an intra mode 2 (2), a VDIA_IDX or a DIA_IDX.

In one implementation form of the present application, an encoder comprising processing circuitry is disclosed (configured) for carrying out the mentioned methods.

In one implementation form of the present application, a decoder comprising processing circuitry is disclosed (configured) for carrying out the mentioned methods. The processing circuitry may be one or more processors such as general-purpose processors, DSPs, programmable hardware such as FPGA or specialized hardware such as ASICs, and/or any other circuitry. The configuration of the processing circuitry may thus include a combination of hardware design, hardware programming or software programming.

In one implementation form of the present application, a computer program product (e.g. stored on a non-transitory medium) comprising a program code is disclosed for performing the mentioned methods.

In one implementation form of the present application, a decoder for construct a MPM list, comprises one or more processors, and a non-transitory computer-readable storage medium coupled to the processors and storing programming for execution by the processors, wherein the programming, when executed by the processors, configures the decoder to carry out the mentioned methods.

In one implementation form of the present application, an encoder for construct a MPM list, comprising one or more processors, and a non-transitory computer-readable storage medium coupled to the processors and storing programming for execution by the processors, wherein the programming, when executed by the processors, configures the encoder to carry out the mentioned methods.

In an example, the order of the intra prediction mode derived from neighboring block of a current prediction block in the MPM list is determined by the samples of reconstructed neighboring block. Here, reconstructed refers to reconstruction at the encoder or decoder in order to obtain samples used as prediction. Reconstruction is performed in certain processing order (encoding, decoding).

In an example, a MPM list is constructed in following steps. In an example, the MPM list may be an empty list before step one. In other words, the MPM list may be initialized as an empty list.

Step one. Determining whether a neighbor block adjacent to a current prediction block is available or not. In an example, in FIG. 5, Block AL, Block A, Block AR, Block L, or Block BL is neighbor block adjacent to a current prediction block. The current CU in FIG. 5 may represent the current prediction block, also referred to as current block. In this step, in an example, all the neighbor blocks adjacent to the current prediction block are available or not is determined, or in another example, part of the neighbor blocks adjacent to the current prediction block are checked whether they are available or not, for example, determine whether the Block L is available or not at first, and then determine whether the Block A is available or not. In another example, only one neighbor block is checked, for example, only determine whether the Block L is available when performing the step one at the first time. Determination of availability may include determining whether or not the neighbor block exists, meaning whether there is a neighboring block to o current block with a specific position. The determination of availability may include determining whether or not the neighbor block is predicted with an intra-mode that can be used as candidate intra-mode.

Step two. For an available neighbor block, determining whether an intra prediction mode of the neighbor block is comprised in the MPM list or not. In an example, for an available neighbor block, the intra prediction mode of the neighbor block is obtained. In an example, if this is the first time to perform step two, if the MPM list is an empty list before this step, the intra prediction mode of the neighbor block is added into the MPM list. It could be understand that in one implementation of the present application, the step adding an intra prediction mode into the MPM list is means that add a value corresponding to the intra prediction mode into the MPM list. In another example, if the intra prediction mode of the neighbor block has been comprised in the MPM list (for example, the value corresponding to the intra prediction mode has been comprised in the MPM list), don't perform the following steps (step three, or step four). And if there is a next available neighbor block, repeat this step for the next block. In another example, if the intra prediction mode of the neighbor block is not comprised in the MPM list, go to step three. In an example, the step two will be finished after all the available neighbor blocks have been processed or a quantity of intra prediction modes in the MPM list is equal to a third threshold.

Step three. Determining whether an intra prediction mode of the neighbor block is a directional intra prediction mode (for example, an angular mode) or not. In an example, when the intra prediction mode of the neighbor block is a directional intra prediction mode, go to step four. In another example, when the intra prediction mode of the neighbor block is not a directional intra prediction mode, for example, the intra prediction mode of the neighbor block is DC mode or is Planar mode, adding the intra prediction mode of the neighbor block into the MPM list. And in an example, after the DC mode or the Planar mode is added into the MPM list, if a quantity of intra prediction modes in the MPM list is less than a third threshold and there is a next available neighbor block has not been processed, go to step two to determine a next available neighbor block. In another example, if a quantity of intra prediction modes in the MPM list is less than a third threshold and there is no available neighbor block, go to step five. The third threshold may be predefined, and the third threshold is a positive integer. In an example, the third threshold may be 3 or 6. The third threshold here corresponds to the MPM list length. It may be fixed, defined by the standard based on further parameters, or signaled within the bitstream. If a quantity of intra prediction modes in the MPM list is equal to the third threshold, the process to construct the MPM list is finished, the MPM list is full and can be used. In an example, the DC mode or the Planar mode is added into the start of the MPM list, or the DC mode (value is 1) or the Planar mode (value is 0) is added into the first part of the MPM list. For example, if a quantity of intra prediction modes in the MPM list to be construed is 3 and there is two intra prediction modes in the MPM list, (20, 18). In an specific example, after adding the DC mode into the MPM list, the MPM list may be (1, 20, 18), or the MPM list may be (20, 1, 18).

Step four. Determining whether a quantity (N) of predicted samples of the current prediction block obtained from the set of reference samples of the neighboring block is greater than or equal to a first threshold or not. In an example, a quantity N of predicted samples of the current block is determined according to positions of a set of reference samples on a boundary of the current block. The first threshold used to compare with a quantity of predicted samples of the current prediction block N may be predefined, and a value of the first threshold is equal to 2, 4, 8 or 16. The first threshold used to compare with a quantity of predicted samples of the current prediction block N may be determined according to a quantity of samples in the current block (for example, the value of the first threshold is equal to ½, ¼, ⅛ or any other fractional part of the total number of the samples of the current block). In an example, if a quantity of predicted samples of the current prediction block N is less than the first threshold, adding the intra prediction mode of the neighbor block into the last part of the MPM list (for example, in the case of 3MPM, the intra prediction mode of the neighbor block is added into the third position in the MPM list, in the case of 6 MPM, the intra prediction mode of the neighbor block is added into the fifth or sixth position in the MPM list). After this intra prediction mode has been added into the MPM list, if a quantity of intra prediction modes in the MPM list is less than a third threshold and there is a next available neighbor block, go to step two, if a quantity of intra prediction modes in the MPM list is less than a third threshold and there is no available neighbor block, go to step five. The third threshold may be predefined, and the third threshold is a positive integer. In an example, the third threshold may be 3 or 6. If a quantity of intra prediction modes in the MPM list is equal to the third threshold, the process to construct the MPM list is finished. In an example, if a quantity of predicted samples of the current prediction block N is less than the first threshold, the intra prediction mode of the neighbor block into the MPM list is not added into the MPM list at this process. And if there is no next available neighbor block, go to step five, if there is a next available neighbor block, go to step two. In an example, if N is greater than or equal to a first threshold, adding the intra prediction mode of the neighbor block into the MPM list. In an example, the intra prediction mode of the neighbor block is added into the start of the MPM list, or the intra prediction mode of the neighbor block is added into the first part of the MPM list. After this intra prediction mode has been added into the MPM list, if a quantity of intra prediction modes in the MPM list is less than a third threshold and there is a next available neighbor block, go to step two, if a quantity of intra prediction modes in the MPM list is less than a third threshold and there is no next available neighbor block, go to step five. The third threshold may be predefined, and the third threshold is a positive integer. In an example, the third threshold may be 3 or 6. If a quantity of intra prediction modes in the MPM list is equal to the third threshold, the process to construct the MPM list is finished.

In an example, a quantity (N) of predicted samples of the current prediction block is obtained according to positions of a set of reference samples on the boundary of the current prediction block. In an example, description prediction of samples could be performed in accordance with "Intra sample prediction" of "Versatile Video Coding (Draft 2)" [JVET-K1001].

In an example, the positions of a set of reference samples on the boundary of the current prediction block is obtained according to the following examples.

Example 1. A plurality of samples comprised in the neighbor block are determined as the set of reference samples.

Example 2. The set of reference samples is defined as reference samples that belong to the side to which selected neighboring block is adjacent to. In an example, as showed in FIG. 9 or FIG. 11, if the selected neighboring block is adjacent to the top side (e.g. "A" or "AR") of the predicted block, available (i.e. non-padded) reference samples of the top side are included into the set of reference samples. This may belong to the A, AL and/or AR block and/or to other blocks adjacent to the current block on the top, e.g. blocs between the A and AL. If the selected neighboring block is adjacent to the left side (e.g. "L" or "BL") of the predicted block, available (non-padded) reference samples of the left side are included into the set of reference samples. For the "AL" neighboring block available reference samples of the both sides are used in the similar manner. The reference samples may belong to the L, AL and/or BL block and/or to other blocks adjacent to the current block on the left side, e.g. blocs between the L and AL. The term "non-padded reference samples" means that the samples are reconstructed samples allowed to be used for intra prediction as reference samples. Non-available reference samples may be padded. Non available reference samples may be those of a different slice, out of picture, or the like.

Figure 12:
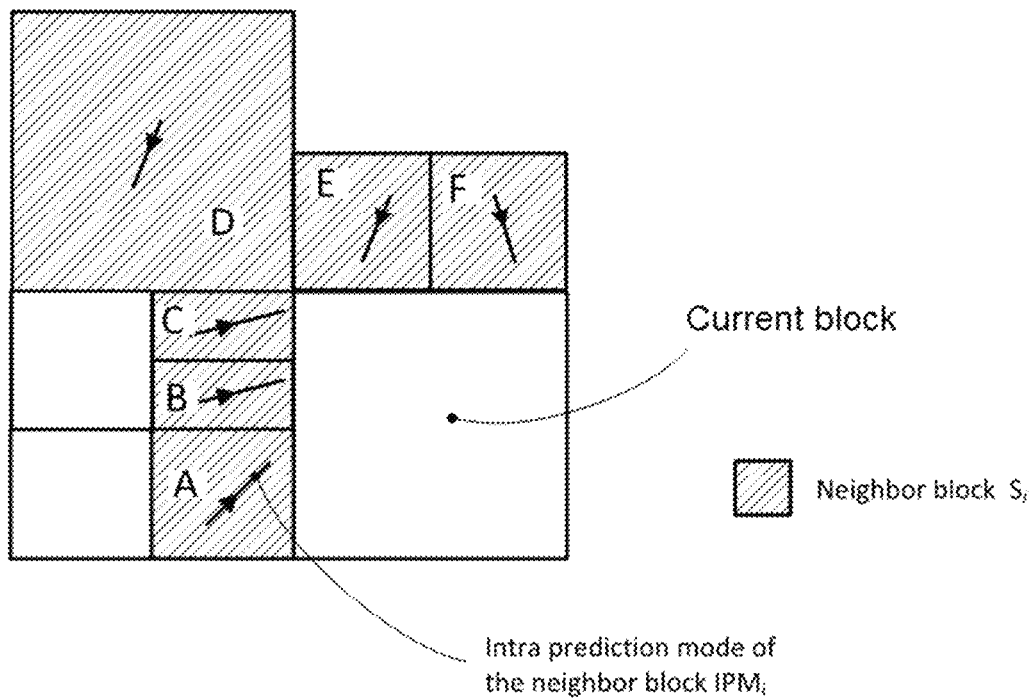
FIG. 12 shows an example of neighbor blocks of the current prediction block that are used in the reference samples fetching procedure.

Embodiment 3. The set of reference samples is defined by a fetching procedure defined by the reference samples fetching procedure. Reference samples fetching procedure consists in performing the following steps in order to derive the set of neighboring samples for a given intra prediction mode m (see FIG. 12). Step 1. Iterate over all the neighboring blocks $S_i$, each of the iterated neighbor blocks $S_i$ has intra prediction mode $IPM_i$, perform the following sub-steps on each iteration. Sub-step 1. If $IPM_i$ is non-directional, skip the rest of sub-steps and start the next iteration Sub-step 2. If $|m-IPM_i|<T|$, add reference samples of $S_i$ to the set of neighboring samples. The value of T (second threshold) could be pre-determined to be equal to 2, 4, 8 or 16. In another embodiment the value of T is set equal to the maximum size of the MPM list. As an example, neighbor blocks iterated at step 1 marked as {A,B,C,D,E,F} in FIG. 12 correspondingly provide the following intra prediction modes {2, 10, 11, 57, 56, 38}. The threshold value T is assigned to be equal to 4. Candidate block C provides mode m=11. In accordance with condition $|m-IPM_i|<T|$, for this candidate mode the set of reference samples would comprise reference samples of blocks B and C. Candidate block E provides mode m=56. In accordance with condition $|m-IPM_i|<T|$, for this candidate mode the set of reference samples would comprise reference samples of blocks D and E.

In an example, the quantity (N) of predicted samples of the current prediction block is an estimation of the effect of the neighboring block samples on the predicted block. This estimation could be obtained using the following rules for the given start and ending positions of the reference samples within a side of the reference samples.

For example, if a neighboring block is located on the above side of the predicted block, $x_0$ and $x_1$ denote left-most and right-most positions of reference samples belonging to the neighboring block, respectively. Herein and further, coordinates x,y given relatively to the top-left reference sample, which coordinates are specified x=0,y=0. Increment of x by 1 means a one sample position shift to the right and increment of y by 1 means a one sample position shift down. For the directional modes and the above-mentioned position of the neighboring block, the value of N is estimated as follows (where H denotes the height of the predicted block):

If intra prediction mode (for example, the intra prediction mode is the mode obtained from the neighboring block which is being checked) is equal to VER_IDX, the value of N is set equal to as $(x_1-x_0)<<\log 2(H)$.

If intra prediction mode is greater than VER_IDX,
If $x_0>H$ and $x_1>H$, the value of N is set equal to as $(x_1-x_0)<<\log 2(H)$.
If $x_0<H$ and $x_1>H$, the value of N is set equal to as $(x_1-H)<<\log 2(H)+(H-x_0)<<\log 2(H-1)$.
Otherwise, the value of N is set equal to as $(x_1-x_0)<<(\log 2(H)-\log 2(x_1)-1)$ Otherwise, if intra prediction mode index is greater than HOR_IDX,
If $x_0>H$ and $x_1>H$, the value of N is set equal to as $(x_1-x_0)<<(\log 2(H)-\log 2(x_1)-1)$
If $x_0<H$ and $x_1>H$, the value of N is set equal to as $(x_1-H)<<\log 2(H)+(H-x_0)<<\log 2(H-1)$.
Otherwise, the value of N is set equal to as $(x_1-x_0)<<\log 2(H)$.

Otherwise, the value of N is set to zero.

In another example, symmetrically, if a neighboring block is located on the left side of the predicted block, x0 and x1 denote left-most and right-most positions of reference samples belonging to the neighboring block, respectively. Herein and further, coordinates x,y given relatively to the top-left reference sample, which coordinates are specified x=0,y=0. Increment of x by 1 means a one sample position shift to the right and increment of y by 1 means a one sample position shift down. For the directional modes and the above-mentioned position of the neighboring block, the value of N is estimated as follows (where W denotes the width of the predicted block):

If intra prediction mode is equal to VER_IDX, the value of N is set equal to as $(y_1-y_0)<<\log 2(W)$.

If intra prediction mode is greater than VER_IDX,
If $y_0>W$ and $y_1>W$, the value of N is set equal to as $(y_1-y_0)<<\log 2(W)$.
If $y_0<W$ and $y_1>W$, the value of N is set equal to as $(y_1-W)<<\log 2(W)+(W-y_0)<<\log 2(W-1)$.
Otherwise, the value of N is set equal to as $(y_1-y_0)<<(\log 2(W)-\log 2(y_1)-1)$ Otherwise, if intra prediction mode index is greater than HOR_IDX,
If $x_0>W$ and $x_1>W$, the value of N is set equal to as $(y_1-y_0)<<(\log 2(W)-\log 2(y_1)-1)$
If $x_0<W$ and $x_1>W$, the value of N is set equal to as $(y_1-W)<<\log 2(W)+(W-y_0)<<\log 2(W-1)$.
Otherwise, the value of N is set equal to as $(y_1-y_0)<<\log 2(W)$.

Otherwise, the value of N is set to zero.

If fractional threshold is used, the value of threshold T is defined relative to the size of the block. For example, if fractional threshold is set equal to ½, the value of T is set to (log 2(W)+log 2(H)))>>1. If fractional threshold is set equal to ¼, the value of T is set to (log 2(W)+log 2(H)))>>2. If fractional threshold is set equal to ⅛, the value of T is set to (log 2(W)+log 2(H)))>>3. Comparison with the threshold could be performed in fixed-point operations using the above-described threshold modification.

However, it is noted that the above approaches to obtain N are only exemplary. The above mentioned calculations do not have to be actually performed. For each intra prediction mode value (index) or for several ranges of intra prediction mode indices, a look-up table may list the estimated quantity N. Then the determination of N may include looking-up the value of N for each of the neighbor blocks A to F based on their respective intra prediction modes.

Moreover, in some embodiments, the quantity N (irrespectively on how it is determined/estimated), may be estimated while taking into account availability of the neighboring blocks which provide reference pixels for prediction with the respective intra prediction mode. For example, when looking at FIG. 12, if block B is not available, the quantity N for intra prediction mode of block A may be reduced with respect to the tabulated or otherwise estimated N, since intra prediction mode of block A for prediction of the current block also uses reference samples of block B. The reduction may be depend on the number of reference pixels present in the non-available block.

Step five. Checking whether a first intra prediction mode of a set of intra-prediction modes is comprised in the MPM list, and add the first intra-prediction mode to the MPM list if the first intra-prediction mode is not comprised in the MPM list, In an example, the set of intra prediction modes comprises a planar mode (0), a DC mode (1), a VER_IDX, a HOR_IDX, an intra mode 2 (2), a VDIA_IDX or a DIA_IDX. The intra prediction modes is added into the MPM list orderly until a quantity of intra prediction modes in the MPM list is equal to the third threshold. The set of intra prediction modes could comprises other intra prediction modes disclosed in other examples.

In another example, the order of the intra prediction mode derived from neighboring block in the MPM list is determined by the impact of the samples of reconstructed neighboring block on the predicted signal.

In the exemplary embodiment, MPM list is constructed from the spatial neighboring blocks as shown in FIG. 5. Decision on whether a mode should be included into MPM and the position of the inserted mode within this list is affected by the combination of intra prediction mode and position of the spatial neighboring block that provides the candidate intra prediction mode. However, the present disclosure is not limited to particular neighboring blocks. The MPM may be constructed based on any of the neighboring blocks, e.g. also blocks which are between the blocks AL and L or AL and R, as long as the order of considering the blocks is known to the encoder and the decoder so that they may work in the same whey when constructing the list. Moreover, it is noted that the reference to top and left blocks in these examples reflects the processing order of the blocks from left to right and from top to bottom. With different processing (encoding, decoding) order of blocks in picture/slice/tile, the considered neighboring blocks may change, as well as the available reference samples for the prediction, as is clear to those skilled in the art.

In the embodiment it is proposed to estimate the impact of the samples of reconstructed neighboring block on the predicted signal and to use the estimation result to determine MPM list position for the candidate mode that belongs to the neighboring block.

Figure 8:
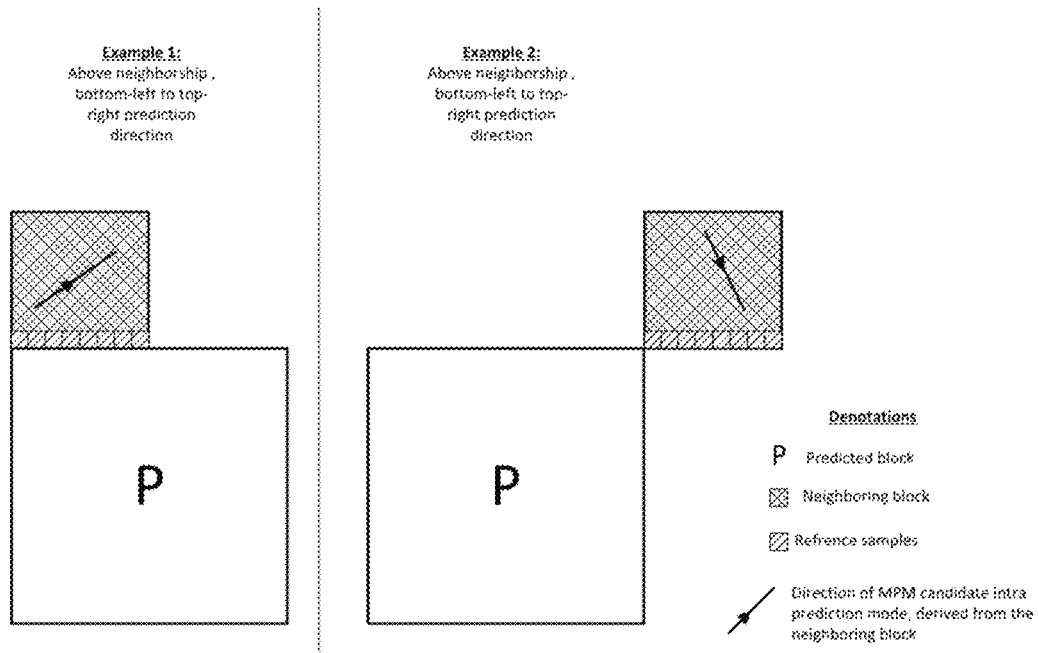
FIG. 8 shows a schematic diagram illustrating an example of reference samples of the neighboring block that will not be used if intra prediction mode derived from neighboring block being used to intra-predict the block.

In some cases (see FIG. 8), it is possible that reference samples belonging to the neighboring block will not affect the predicted signal if an intra prediction mode is inferred from this block. For such kind of MPM candidate intra prediction modes it is proposed to either do not consider these modes when checking neighbor blocks, or to decrease priority for these intra prediction mode when constructing MPM list, i.e. to signal them with code words of greater length.

In another example, the case when reference samples of the block are not available in scanning order may occur.

In this embodiment similar modification to MPM list processing are applied to intra prediction modes that are inferred from blocks that provide padded values of the reference samples. In some exemplary embodiments, the padded values do not impact N and do not count under the quantity of N.

Figure 9:
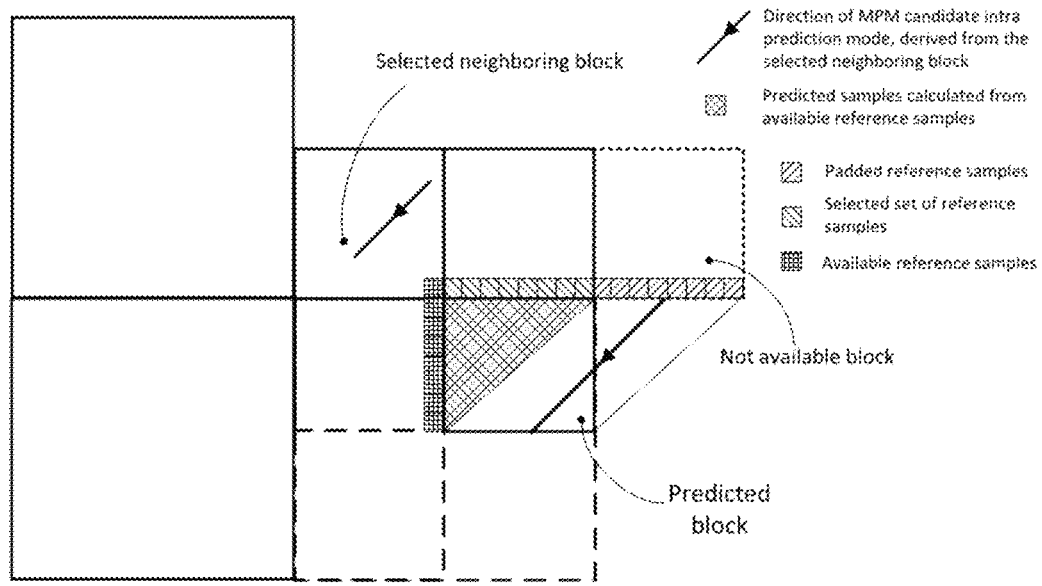
FIG. 9 shows another schematic diagram illustrating an example of a set of reference samples.

In FIG. 9, "AR" candidate is not yet reconstructed when generating prediction signal for the predicted block. Hence, intra prediction mode from this spatial candidate block could be either skipped or put in the MPM with lower priority.

Figure 11:
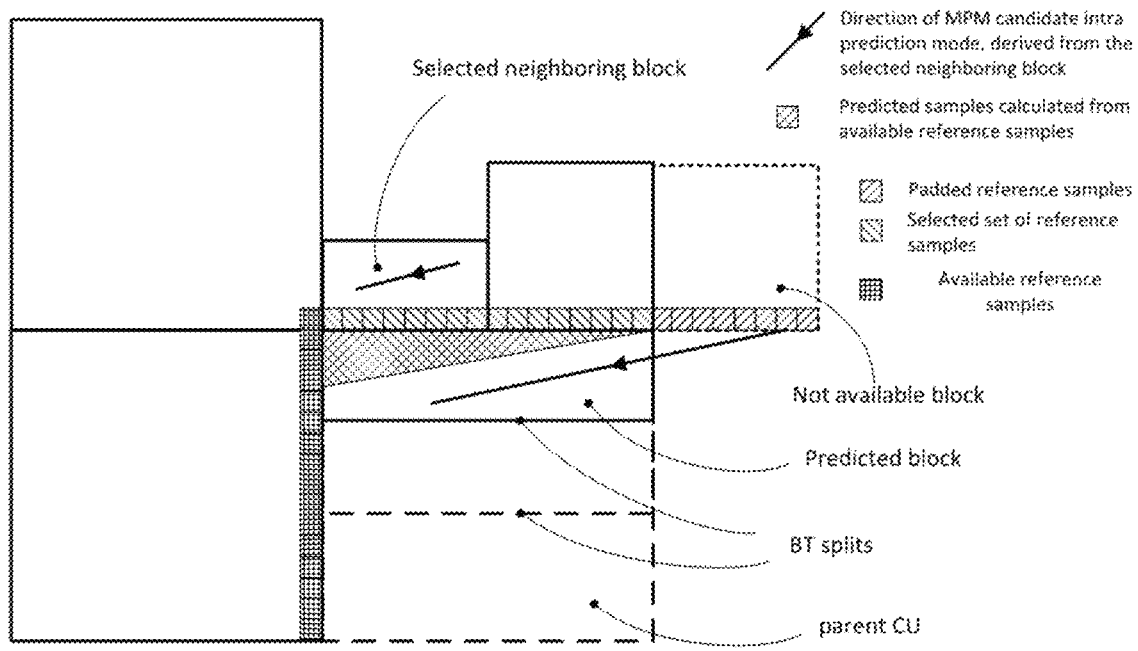
FIG. 11 shows another schematic diagram illustrating an example of a set of reference samples.

This embodiment is applicable in combination with different partitioning trees, including, but not limited to quadtree (QT), see FIG. 9, QTBT, see FIG. 11 and multiple-tree (MTT), not shown, partitioning types.

In an example, a method for constructing a MPM list for intra prediction, the method comprising determining whether a first neighbor block adjacent to a current block is available or not, if the first neighbor block is not available, using a next neighbor block adjacent to the current block as the first neighbor block and repeating the above steps, if the first neighbor block is available, determining whether an intra prediction mode of the first neighbor block is comprised in the MPM list, if the intra prediction mode of the first neighbor block is comprised in the MPM list, using a next neighbor block adjacent to the current block as the first neighbor block and repeating the above steps, if the intra prediction mode of the first neighbor block is not comprised in the MPM list, determining whether the intra prediction mode of the first neighbor block is a direction prediction mode or not, if the intra prediction mode of the first neighbor block is a direction prediction mode, determining, according to the first neighbor block, whether a quantity of predicted samples of the current block is greater than or equal to a threshold or not, if the quantity of predicted samples of the current block is greater than or equal to the threshold adding the intra prediction mode of the first neighbor block into the MPM list, determining whether a quantity of intra prediction modes comprised the MPM list is less than a threshold or not, if a quantity of intra prediction modes comprised the MPM list is less than a threshold, using a next neighbor block adjacent to the current block as the first neighbor block and repeating the above steps.

In one aspect of the present disclosure, a method for constructing a MPM list is disclosed, the method comprises determining whether a left block of a current coding block is available or not, if the left block of the current coding block is available, adding an intra prediction mode of the left block into an MPM list determining whether an above block of the current coding block is available or not, if the above block of the current coding block is available, adding an intra prediction mode of the above block into the MPM list, if a planar mode is not comprised in the MPM list, adding the planar mode into the MPM list, if a DC mode is not comprised in the MPM list, adding the DC mode into the MPM list.

In one implementation form of the present application, if the above block of the current coding block is available and an intra prediction mode of the above block is not comprised in the MPM list, adding the intra prediction mode of the above block into the MPM list.

In one implementation form of the present application, if the above block of the current coding block is available and an intra prediction mode of the above block is comprised in the MPM list, the "adding" performed or we can say the result of the "adding" process doesn't change the MPM list.

In one implementation form of the present application, when the prediction mode of the left block is not an intra prediction mode, the left block of the current coding block is not available.

In one implementation form of the present application, when the current coding block is a coding block located in the left-most side of a frame, the left block of the current coding block is not available.

In one implementation form of the present application, parallel processing is supported and the current coding block is a coding block located in the left-most side of a Tile, the left block of the current coding block is not available.

In one implementation form of the present application, wherein parallel processing is not supported and the current coding block is a coding block located in the left-most side of a Tile but not in the left-most side of a frame, the left block of the current coding block is available.

In one implementation form of the present application, parallel processing is supported and the current coding block is a coding block located in the left-most side of a slice, the left block of the current coding block is not available.

In one implementation form of the present application, parallel processing is not supported and the current coding block is a coding block located in the left-most side of a slice but not in the left-most side of a frame, the left block of the current coding block is available.

In one implementation form of the present application, when the prediction mode of the above block is not an intra prediction mode, the above block of the current coding block is not available.

In one implementation form of the present application, when the current coding block is a coding block located in the top-most side of a frame, the above block of the current coding block is not available.

In one implementation form of the present application, parallel processing is supported and the current coding block is a coding block located in the top-most side of a Tile, the above block of the current coding block is not available.

In one implementation form of the present application, parallel processing is not supported and the current coding block is a coding block located in the top-most side of a Tile but not in the top-most side of a frame, the above block of the current coding block is available.

In one implementation form of the present application, parallel processing is supported and the current coding block is a coding block located in the top-most side of a slice, the above block of the current coding block is not available.

In one implementation form of the present application, parallel processing is not supported and the current coding block is a coding block located in the top-most side of a slice but not in the top-most side of a frame, the above block of the current coding block is available.

In one implementation form of the present application, when line buffer size is constrained and the current coding block is a coding block located in the top-most side of a current CTU, the above block of the current coding block is not available.

In one implementation form of the present application, wherein when the current coding block is a coding block not located in the left-most side of a frame, the left block of the current coding block is available.

In one implementation form of the present application, when the current coding block is a coding block not located in the above-most side of a frame, the above block of the current coding block is available.

In one implementation form of the present application, the method further comprises, if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX (as first intra prediction mode), a HOR_IDX, an intra mode 2 (2), a VDIA_IDX or a DIA_IDX.

In one implementation form of the present application, a value corresponding to the VER_IDX is 50, a value corresponding to the HOR_IDX is 18, a value corresponding to the VDIA_IDX is 66, and this value may be the largest value in the values corresponding to the angular modes, the value 2 which corresponding to the intra mode 2 may be the smallest value in the values corresponding to the angular modes, a value corresponding to the DIA_IDX is 34.

In one implementation form of the present application, if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX (as first intra prediction mode), a HOR_IDX, an intra mode 2 (2), a VDIA_IDX or a DIA_IDX.

In one implementation form of the present application, the method further comprises, if a quantity of intra prediction modes in the MPM list is less than a threshold, adding iteratively an intra-prediction mode of a set of intra-prediction modes comprising a VER_IDX, a HOR_IDX, an intra mode 2 (2), a VDIA_IDX or a DIA_IDX according to the aforementioned order to the MPM list, when the intra-prediction mode is not comprised in the MPM list, until the quantity of prediction modes is equal to the threshold. The threshold here corresponds to a predefined length of the MPM list.

In one implementation form of the present application, the method further comprises, if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX (as first intra prediction mode), a VDIA_IDX, a DIA_IDX or an intra mode 2 (2).

In one implementation form of the present application, the method further comprises, if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX (as first intra prediction mode), a HOR_IDX, an intra prediction mode corresponding to VER_IDX with an offset −4 or an intra prediction mode corresponding to VER_IDX with an offset 4.

In one implementation form of the present application, an intra prediction mode corresponding to VER_IDX with an offset −4 is using the value corresponding to the VER_IDX to add the offset −4 and obtain the value of the corresponded intra prediction mode, for example, as the value of VER_IDX is 50, an intra prediction mode corresponding to VER_IDX with an offset −4 is the intra prediction mode 46, an intra prediction mode corresponding to VER_IDX with an offset 4 is the intra prediction mode 54. The other examples with offset has similar process as this example.

Note that when performing −1 or +1 or other offset values, it might involve a wrap up and wrap down operation, for example, as the value of intra mode (2) is 2 (the smallest value in the values corresponding to the angular modes), then intra mode (2)-1 would be 66 (wrap up case), or as the value of VDIA_IDX is 66 (the biggest value in the values corresponding to the angular modes), then VDIA_IDX+1 would be 2 (wrap down case).

In one implementation form of the present application, the method further comprises, if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX (as first intra prediction mode), a HOR_IDX, an intra prediction mode corresponding to VER_IDX with an offset 4 or an intra prediction mode corresponding to VER_IDX with an offset −4.

In one implementation form of the present application, the method further comprises, if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises one of the following intra prediction modes sets a VER_IDX (as first intra prediction mode), a VDIA_IDX, an intra prediction mode corresponding to VER_IDX with an offset −1, and an intra prediction mode corresponding to VER_IDX with an offset 1, or a VER_IDX (as first intra prediction mode), a VDIA_IDX, an intra prediction mode corresponding to VER_IDX with an offset −4, and an intra prediction mode corresponding to VER_IDX with an offset 4, or a VER_IDX (as first intra prediction mode), a VDIA_IDX, an intra prediction mode corresponding to VDIA_IDX with an offset −4, and an intra prediction mode corresponding to VER_IDX with an offset −1, or a VER_IDX (as first intra prediction mode), a VDIA_IDX, an intra prediction mode corresponding to VDIA_IDX with an offset −4, and an intra prediction mode corresponding to VER_IDX with an offset+1, or a VER_IDX (as first intra prediction mode), a VDIA_IDX, an intra prediction mode corresponding to VDIA_IDX with an offset −1, and an intra prediction mode corresponding to VER_IDX with an offset −1, or a VER_IDX (as first intra prediction mode), a VDIA_IDX, an intra prediction mode corresponding to VDIA_IDX with an offset −1, and an intra prediction mode corresponding to VER_IDX with an offset 1, or a VER_IDX (as first intra prediction mode), a VDIA_IDX, an intra prediction mode corresponding to VER_IDX with an offset −1, and an intra prediction mode corresponding to VDIA_IDX with an offset −4, or a VER_IDX (as first intra prediction mode), a VDIA_IDX, an intra prediction mode corresponding to VER_IDX with an offset 1, and an intra prediction mode corresponding to VDIA_IDX with an offset −4, or a VER_IDX (as first intra prediction mode), a VDIA_IDX, an intra prediction mode corresponding to VER_IDX with an offset −1, and an intra prediction mode corresponding to VDIA_IDX with an offset −1, or a VER_IDX (as first intra prediction mode), a VDIA_IDX, an intra prediction mode corresponding to VER_IDX with an offset 1, and an intra prediction mode corresponding to VDIA_IDX with an offset −1.

In one implementation form of the present application, wherein the method further comprises, if the left block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold, wherein the set of intra-prediction modes comprises one of the following intra prediction modes sets a VER_IDX, a VDIA_IDX, an intra prediction mode corresponding to VER_IDX with an offset −1, and an intra prediction mode corresponding to VER_IDX with an offset 1, or a VER_IDX, a VDIA_IDX, an intra prediction mode corresponding to VER_IDX with an offset −4, and an intra prediction mode corresponding to VER_IDX with an offset 4, or a VER_IDX, a VDIA_IDX, an intra prediction mode corresponding to VDIA_IDX with an offset −4, and an intra prediction mode corresponding to VER_IDX with an offset −1, or a VER_IDX, a VDIA_IDX, an intra prediction mode corresponding to VDIA_IDX with an offset −4, and an intra prediction mode corresponding to VER_IDX with an offset+1, or a VER_IDX, a VDIA_IDX, an intra prediction mode corresponding to VDIA_IDX with an offset −1, and an intra prediction mode corresponding to VER_IDX with an offset −1, or a VER_IDX, a VDIA_IDX, an intra prediction mode corresponding to VDIA_IDX with an offset −1, and an intra prediction mode corresponding to VER_IDX with an offset 1, or a VER_IDX, a VDIA_IDX, an intra prediction mode corresponding to VER_IDX with an offset −1, and an intra prediction mode corresponding to VDIA_IDX with an offset −4, or a VER_IDX, a VDIA_IDX, an intra prediction mode corresponding to VER_IDX with an offset 1, and an intra prediction mode corresponding to VDIA_IDX with an offset −4, or a VER_IDX, a VDIA_IDX, an intra prediction mode corresponding to VER_IDX with an offset −1, and an intra prediction mode corresponding to VDIA_IDX with an offset −1, or a VER_IDX, a VDIA_IDX, an intra prediction mode corresponding to VER_IDX with an offset 1, and an intra prediction mode corresponding to VDIA_IDX with an offset −1.

In one implementation form of the present application, the method further comprises, if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a HOR_IDX (as first intra prediction mode), an intra mode 2 (2), a DIA_IDX or a VDIA_IDX.

In one implementation form of the present application, wherein the method further comprises, if a quantity of intra prediction modes in the MPM list is less than a threshold, the left block of the current coding block is available and the above block of the current coding block is available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX (as first intra prediction mode), a HOR_IDX, an intra mode 2 (2), a VDIA_IDX or a DIA_IDX.

In one implementation form of the present application, wherein the method further comprises, if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a HOR_IDX (as first intra prediction mode), an intra mode 2 (2), a DIA_IDX or a VDIA_IDX.

In one implementation form of the present application, the method further comprises, if a quantity of intra prediction modes in the MPM list is less than a threshold, the left block of the current coding block is available and the above block of the current coding block is available, checking whether a first intra prediction mode of a set of intra-prediction modes is comprised in the MPM list, and adding the first intra-prediction mode to the MPM list if the first intra-prediction mode is not comprised in the MPM list, wherein the set of intra-prediction modes comprises a VER_IDX (as first intra prediction mode), a HOR_IDX, an intra prediction mode corresponding to VER_IDX with an offset −4 or an intra prediction mode corresponding to VER_IDX with an offset 4.

In one implementation form of the present application, the method further comprises, if the above block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises one of the following intra prediction modes sets a HOR_IDX (as first intra prediction mode), an intra mode 2 (2), an intra prediction mode corresponding to HOR_IDX with an offset −1, and an intra prediction mode corresponding to HOR_IDX with an offset 1, or a HOR_IDX (as first intra prediction mode), an intra mode 2 (2), an intra prediction mode corresponding to HOR_IDX with an offset −4, and HOR_IDX add an offset 4, or a HOR_IDX (as first intra prediction mode), an intra mode 2 (2), an intra prediction mode corresponding to an intra mode 2 (2) with an offset 4, and an intra prediction mode corresponding to HOR_IDX with an offset −1, or a HOR_IDX (as first intra prediction mode), an intra mode 2 (2), an intra prediction mode corresponding to an intra mode 2 (2) with an offset 4, and an intra prediction mode corresponding to HOR_IDX with an offset 1, or a HOR_IDX (as first intra prediction mode), an intra mode 2 (2), an intra prediction mode corresponding to an intra mode 2 (2) with an offset 1, and an intra prediction mode corresponding to HOR_IDX with an offset −1, or a HOR_IDX (as first intra prediction mode), an intra mode 2 (2), an intra prediction mode corresponding to an intra mode 2 (2) with an offset 1, and an intra prediction mode corresponding to HOR_IDX with an offset 1, or a HOR_IDX (as first intra prediction mode), an intra mode 2 (2), an intra prediction mode corresponding to HOR_IDX with an offset −1, and an intra prediction mode corresponding to an intra mode 2 (2) with an offset 4, or a HOR_IDX (as first intra prediction mode), an intra mode 2 (2), an intra prediction mode corresponding to HOR_IDX with an offset 1, and an intra prediction mode corresponding to an intra mode 2 (2) with an offset 4, or a HOR_IDX (as first intra prediction mode), an intra mode 2 (2), an intra prediction mode corresponding to HOR_IDX with an offset −1, and an intra prediction mode corresponding to an intra mode 2 (2) with an offset 1, or a HOR_IDX (as first intra prediction mode), an intra mode 2 (2), an intra prediction mode corresponding to HOR_IDX with an offset 1, and an intra prediction mode corresponding to an intra mode 2 (2) with an offset 1.

In one implementation form of the present application, wherein the method further comprises, if the above block of the current coding block is not available and a quantity of intra prediction modes in the MPM list is less than a threshold, adding iteratively an intra-prediction mode of a set of intra-prediction modes according to the aforementioned order to the MPM list, when the intra-prediction mode is not comprised in the MPM list, until the quantity of prediction modes is equal to the threshold, wherein the set of intra-prediction modes comprising one of the following intra prediction modes sets a HOR_IDX, an intra mode 2 (2), an intra prediction mode corresponding to HOR_IDX with an offset −1, and an intra prediction mode corresponding to HOR_IDX with an offset 1, or a HOR_IDX, an intra mode 2 (2), an intra prediction mode corresponding to HOR_IDX with an offset −4, and HOR_IDX add an offset 4, or a HOR_IDX, an intra mode 2 (2), an intra prediction mode corresponding to an intra mode 2 (2) with an offset 4, and an intra prediction mode corresponding to HOR_IDX with an offset −1, or a HOR_IDX, an intra mode 2 (2), an intra prediction mode corresponding to an intra mode 2 (2) with an offset 4, and an intra prediction mode corresponding to HOR_IDX with an offset 1, or a HOR_IDX, an intra mode 2 (2), an intra prediction mode corresponding to an intra mode 2 (2) with an offset 1, and an intra prediction mode corresponding to HOR_IDX with an offset −1, or a HOR_IDX, an intra mode 2 (2), an intra prediction mode corresponding to HOR_IDX with an offset 1, or a HOR_IDX, an intra mode 2 (2), an intra prediction mode corresponding to HOR_IDX with an offset −1, and an intra prediction mode corresponding to an intra mode 2 (2) with an offset 4, or a HOR_IDX, an intra mode 2 (2), an intra prediction mode corresponding to HOR_IDX with an offset 1, and an intra prediction mode corresponding to an intra mode 2 (2) with an offset 4, or a HOR_IDX, an intra mode 2 (2), an intra prediction mode corresponding to HOR_IDX with an offset −1, and an intra prediction mode corresponding to an intra mode 2 (2) with an offset 1, or a HOR_IDX, an intra mode 2 (2), an intra prediction mode corresponding to HOR_IDX with an offset 1, and an intra prediction mode corresponding to an intra mode 2 (2) with an offset 1.

In one implementation form of the present application, the method further comprises, if a quantity of intra prediction modes in the MPM list is less than a threshold, adding iteratively an intra-prediction mode of a set of intra-prediction modes comprising a VER_IDX, a HOR_IDX, an intra mode 2 (2), a VDIA_IDX or a DIA_IDX according to the aforementioned order to the MPM list, when the intra-prediction mode is not comprised in the MPM list, until the quantity of prediction modes is equal to the threshold.

In one implementation form of the present application, the method further comprises, if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprises a VER_IDX, a VDIA_IDX, a DIA_IDX or an intra mode 2 (2).

In one implementation form of the present application, it could be understood that adding an intra prediction mode into the MPM list is adding a value corresponding to the intra prediction mode into the MPM list.

In one implementation form of the present application, the threshold is 6.

In one aspect of the present application, an encoder comprising processing circuitry for carrying out the above methods.

In one aspect of the present application, a decoder comprising processing circuitry for carrying out the above methods.

In one aspect of the present application, a computer program product comprising a program code for performing the above methods.

In one aspect of the present application, a decoder for construct a MPM list, comprising one or more processors, and a non-transitory computer-readable storage medium coupled to the processors and storing programming for execution by the processors, wherein the programming, when executed by the processors, configures the decoder to carry out the above methods.

In one aspect of the present application, an encoder for construct a MPM list, comprising one or more processors, and a non-transitory computer-readable storage medium coupled to the processors and storing programming for execution by the processors, wherein the programming, when executed by the processors, configures the encoder to carry out the above methods.

In an example,

Step one. Determining whether a left block of a current coding block is available or not.

If the left block of the current coding block is available, adding an intra prediction mode of the left block into an MPM list. The MPM list may be an empty list, if the left block of the current coding block is available, an intra prediction mode of the left block is added into the MPM list, then the MPM list includes one intra prediction mode, and if the left block of the current coding block is not available, the MPM list still is an empty list after step one.

Step two. Determining whether an above block of the current coding block is available or not.

If the above block of the current coding block is available, adding an intra prediction mode of the above block into the MPM list. The MPM list may be includes the intra prediction mode of the left block or still an empty list.

If the above block of the current coding block is available and the MPM list includes the intra prediction mode of the left block, it is further to determine whether the intra prediction mode of the above block is same as the intra prediction mode of the left block, if they are same, the result of the step "adding an intra prediction mode of the above block into the MPM list" don't change the quantity of intra prediction mode in the MPM list, the MPM list only includes one intra prediction mode, if the intra prediction mode of the above block is not same as the intra prediction mode of the left block, adding the intra prediction mode of the above block into the MPM list and then the MPM list includes two intra prediction modes.

If the above block of the current coding block is available and the MPM list still is an empty list, adding the intra prediction mode of the above block into the MPM list, the MPM list includes only one intra prediction mode.

If the above block of the current coding block is not available and the MPM list includes the intra prediction mode of the left block, the MPM list will still only includes the intra prediction mode of the left block.

If the above block of the current coding block is not available and the MPM list still is an empty list, the MPM list will still be an empty list.

Step three, if a planar mode is not in the MPM list, adding the planar mode into the MPM list.

If after step two, the MPM list doesn't include a planar mode, then adding the planar mode into the MPM list.

If both the intra prediction mode of the left block and the intra prediction mode of the above block are not available, or the available intra prediction mode is not the planar mode, the MPM list doesn't include a planar mode.

If a planar mode is in the MPM list, go to step four.

Step four, if a DC mode is not in the MPM list, adding the DC mode into the MPM list.

If after step two or step three, the MPM list doesn't include a DC mode, then adding the DC mode into the MPM list.

If both the intra prediction mode of the left block and the intra prediction mode of the above block are not available, or the available intra prediction mode is not the DC mode, the MPM list doesn't include a DC mode.

If a DC mode is in the MPM list, go to the following steps or finish construct the MPM list.

In one implementation form of the present application, in each step, the process to add a prediction mode into the MPM list need to make sure no duplicated prediction modes in the MPM list. Hence, if an intra prediction mode need to be added into the MPM list is same as one intra prediction mode in the MPM list, the "adding" process does not change the MPM list or the "adding" process is not performed.

In one implementation form of the present application, after step 4, only if angular mode exist, then do angular−1, angular+1.

In an example, if a quantity of intra prediction modes in the MPM list is six. After step four, there are three cases regarding the length of MPM. Case 1. MPM length is 2. ☐ both L and A not angular(>DC) or not available, only planar and DC in ☐ use all four default modes. Case 2. MPM length is 3. ☐ one of L and A is angular, or they are same angular. ☐ use one default mode. Case 3. MPM length is 4. ☐ both L and A is angular and they are different ☐ no default mode is used, as at least one of L−1, L+1, will be added. If one of them is a duplication of above (diff(L−A)=1), then at least one of A−1 and A+1 will be further inserted.

In one implementation form of the present application, the method further comprises, if the left block of the current coding block is available and the intra prediction mode of the left block is an angular mode, adding an offset to the prediction mode of the left block to obtain a new prediction mode, if the new prediction mode is not in the MPM list, adding the new prediction mode into the MPM list.

In another example, the MPM list includes six intra prediction modes, as the above four steps only could obtain four intra prediction modes in largest case. The method further comprises the following. Step five, if the left block of the current coding block is available and the intra prediction mode of the left block is an angular mode, adding an offset to the prediction mode of the left block to obtain a new prediction mode, and if the new prediction mode is not in the MPM list, adding the new prediction mode into the MPM list. For example, if the left block of the current coding block is angular mode 27 (a value corresponding to this angular intra prediction mode is 27), and the MPM list after the above four steps is (27, 15, 0, 1). Adding an offset to the prediction mode of the left block to obtain a new prediction mode, if the new prediction mode is not in the MPM list, adding the new prediction mode into the MPM list. In an example, the offset is −1, so the new prediction mode is 26 and an updated MPM list is (27, 15, 0, 1, 26). In another example, the offset is 1, so the new prediction mode is 28 and an updated MPM list is (27, 15, 0, 1, 28). In another example, step five could adding two offsets to the intra prediction mode of the left block, first add −1 and then add 1 or first add 1 and then add −1, so the updated MPM list may be (27, 15, 0, 1, 26, 28) or (27, 15, 0, 1, 28, 26). After step five, check whether the MPM list is full (If a quantity of intra prediction modes in the MPM list is equal to a threshold, for example, the threshold is 6, then the MPM list is full. If a quantity of intra prediction modes in the MPM list is less than a threshold, then the MPM list is not full). If the MPM list is full, finish construct the MPM list, if the MPM list is not full, go to the following steps. And if the left block of the current coding block is not available, step five is not performed and go to following steps.

Note that when adding an offset (for example, −1 or +1) to an angular prediction mode, it might involve a wrap up and wrap down operation, for example, If an angular prediction mode angularLeft is 2, then angularLeft−1 would be 66 (wrap up case), or if angularLeft is 66, then angularLeft+1 would be 2 (wrap down case).

In one implementation form of the present application, the method further comprises, if the above block of the current coding block is available and the intra prediction mode of the above block is an angular mode, adding an offset to the prediction mode of the above block to obtain an above-offset prediction mode, if the above-offset prediction mode is not in the MPM list, adding the above-offset prediction mode into the MPM list.

In an example, the method further comprises the following. Step six, if the above block of the current coding block is available and the intra prediction mode of the above block is an angular mode, adding an offset to the prediction mode of the above block to obtain an above-offset prediction mode, and if the above-offset prediction mode is not in the MPM list, adding the new prediction mode into the MPM list. For example, if the above block of the current coding block is angular mode 26 (a value corresponding to this angular intra prediction mode is 26), and the MPM list after the above five steps is (27, 26, 0, 1, 28). Adding an offset to the prediction mode of the left block to obtain an above-offset prediction mode, if the above-offset prediction mode is not in the MPM list, adding the above-offset prediction mode into the MPM list. In an example, the offset is −1, so the above-offset prediction mode is 25 and an updated MPM list is (27, 26, 0, 1, 28, 25). In another example, the offset is 1, so the above-offset prediction mode is 27 and the insertion of above-offset mode 27 is blocked, since mode 27 has been inserted. In another example, step six could add two offsets to the intra prediction mode of the above block, first add −1 and then add 1 or first add 1 and then add −1, if the MPM list is still not full after added one offset. Moreover, if the above block of the current coding block is not available, step six is not performed and go to following steps. After step six, check whether the MPM list is full (a quantity of intra prediction modes in the MPM list is equal to 6). If the MPM list is full, finish construct the MPM list, if the MPM list is not full (a quantity of intra prediction modes in the MPM list is less than 6), go to the following steps.

In one implementation form of the present application, when a left block of the current coding block is not available, an above block of the current coding block may be available or may be not available.

In one implementation form of the present application, when an above block of the current coding block is not available, a left block of the current coding block may be available or may be not available.

In one implementation form of the present application, the method further comprises adding a VER_IDX, a HOR_IDX, an intra mode 2 (2), a VDIA_IDX or a DIA_IDX into the MPM list.

In one implementation form of the present application, the method further comprises, if a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a VER_IDX, a HOR_IDX, an intra mode 2 (2), a VDIA_IDX or a DIA_IDX.

In one implementation form of the present application, the method further comprises, if a quantity of intra prediction modes in the MPM list is less than a threshold, adding iteratively an intra-prediction mode of a set of intra-prediction modes comprising a VER_IDX, a HOR_IDX, an intra mode 2 (2), a VDIA_IDX or a DIA_IDX according to the aforementioned order to the MPM list, when the intra-prediction mode is not comprised in the MPM list, until the quantity of prediction modes is equal to the threshold.

In an example, after step six, if the MPM list is still not full (a quantity of intra prediction modes in the MPM list less than a threshold), adding an intra prediction mode in a default mode list orderly into the MPM list if this mode or these modes are not in the MPM list, iteratively this step until the MPM list is full. Step seven adding a VER_IDX, a HOR_IDX, an intra mode 2 (2), a VDIA_IDX or a DIA_IDX into the MPM list. For example, if a VER_IDX is not in the MPM list and the MPM list is not full, add the VER_IDX into the MPM list, if the MPM list is full after add the VER_IDX, finish construct the MPM list. Moreover, if the MPM list is still not full after add the VER_IDX, check whether a HOR_IDX is in the MPM list. If the HOR_IDX is in the MPM list, further to check whether an intra mode 2 is in the MPM list, if the HOR_IDX is not in the MPM list, add the HOR_IDX into the MPM list. Iteratively this step until the MPM list is full.

In one implementation form of the present application, in Step seven, with the default modes lists, every insertion of default mode to the MPM list shall make sure no duplicated mode is inserted. If the insertion is successful, another check is performed to detect whether the MPM is full. If so, then the MPM construction process terminates, otherwise, continue insertion with other default mode with the specified order.

In one implementation form of the present application, the method further comprises, if the left block of the current coding block is not available and a quantity of intra prediction modes in the MPM list is less than a threshold, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a VER_IDX, a VDIA_IDX, a DIA_IDX or an intra mode 2 (2).

In one implementation form of the present application, the method further comprises, if the left block of the current coding block is not available and a quantity of intra prediction modes in the MPM list is less than a threshold, adding iteratively an intra-prediction mode of a set of intra-prediction modes comprising a VER_IDX, a VDIA_IDX, a DIA_IDX or an intra mode 2 (2) according to the aforementioned order to the MPM list, when the intra-prediction mode is not comprised in the MPM list, until the quantity of prediction modes is equal to the threshold.

In an example, after step six, if the MPM list is still not full and the left block of the current coding block is not available, adding intra prediction mode in a default mode list orderly into the MPM list if this mode or these modes are not in the MPM list, iteratively this step until the MPM list is full. Step seven adding a VER_IDX, a VDIA_IDX, a DIA_IDX or an intra mode 2 (2) into the MPM list. For example, if a VER_IDX is not in the MPM list and the MPM list is not full, add the VER_IDX into the MPM list, if the MPM list is full after add the VER_IDX, finish construct the MPM list. Moreover, if the MPM list is still not full after add the VER_IDX, check whether a VDIA_IDX is in the MPM list. If the VDIA_IDX is in the MPM list, further to check whether a DIA_IDX is in the MPM list, if the DIA_IDX is not in the MPM list, add the DIA_IDX into the MPM list. Iteratively this step until the MPM list is full.

In one implementation form of the present application, the method further comprises, if a quantity of intra prediction modes in the MPM list is less than a threshold, the above block of the current coding block is not available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a HOR_IDX, an intra mode 2 (2), a DIA_IDX or a VDIA_IDX.

In one implementation form of the present application, the method further comprises, if a quantity of intra prediction modes in the MPM list is less than a threshold, the above block of the current coding block is not available, adding iteratively an intra-prediction mode of a set of intra-prediction modes comprising a HOR_IDX, an intra mode 2 (2), a DIA_IDX or a VDIA_IDX according to the aforementioned order to the MPM list, when the intra-prediction mode is not comprised in the MPM list, until the quantity of prediction modes is equal to the threshold.

In an example, after step six, if the MPM list is still not full, the above block of the current coding block is not available, adding intra prediction mode in a default mode list orderly into the MPM list if this mode or these modes are not in the MPM list, iteratively this step until the MPM list is full. Step seven adding a HOR_IDX, an intra mode 2 (2), a DIA_IDX or a VDIA_IDX into the MPM list. For example, if a HOR_IDX is not in the MPM list and the MPM list is not full, add the HOR_IDX into the MPM list, if the MPM list is full after add the HOR_IDX, finish construct the MPM list. Moreover, if the MPM list is still not full after add the HOR_IDX, check whether an intra mode 2 is in the MPM list. If the intra mode 2 is in the MPM list, further to check whether a DIA_IDX is in the MPM list, if the DIA_IDX is not in the MPM list, add the DIA_IDX into the MPM list. Iteratively this step until the MPM list is full.

In one implementation form of the present application, the method further comprises, if a quantity of intra prediction modes in the MPM list is less than a threshold, the left block of the current coding block is available and the above block of the current coding block is available, checking whether a first intra prediction mode of a set of intra-prediction modes is comprised in the MPM list, and add the first intra-prediction mode to the MPM list if the first intra-prediction mode is not comprised in the MPM list, wherein the set of intra-prediction modes comprising a VER_IDX, a HOR_IDX, an intra mode 2 (2), a VDIA_IDX or a DIA_IDX.

In one implementation form of the present application, the method further comprises, if a quantity of intra prediction modes in the MPM list is less than a threshold, the left block of the current coding block is available and the above block of the current coding block is available, adding iteratively an intra-prediction mode of a set of intra-prediction modes comprising a VER_IDX, a HOR_IDX, an intra mode 2 (2), a VDIA_IDX or a DIA_IDX according to the aforementioned order to the MPM list, when the intra-prediction mode is not comprised in the MPM list, until the quantity of prediction modes is equal to the threshold.

In an example, after step six, if the MPM list is still not full, the left block of the current coding block is available and the above block of the current coding block is also available, adding intra prediction mode in a default mode list into the MPM list if this mode or these modes are not in the MPM list, iteratively this step until the MPM list is full. Step seven adding a VER_IDX, a HOR_IDX, an intra mode 2 (2), a VDIA_IDX or a DIA_IDX into the MPM list. For example, if a VER_IDX is not in the MPM list and the MPM list is not full, add the VER_IDX into the MPM list, if the MPM list is full after add the VER_IDX, finish construct the MPM list. Moreover, if the MPM list is still not full after add the VER_IDX, check whether a HOR_IDX is in the MPM list. If the HOR_IDX is in the MPM list, further to check whether an intra mode 2 is in the MPM list, if the intra mode 2 is not in the MPM list, add the intra mode 2 into the MPM list. Iteratively this step until the MPM list is full.

In one implementation form of the present application, the method further comprises adding a VER_IDX, a HOR_IDX, a VER_IDX add an offset −4 or a VER_IDX add an offset 4 into the MPM list.

In one implementation form of the present application, the method further comprises adding a VER_IDX, a HOR_IDX, a VER_IDX add an offset 4 or a VER_IDX add an offset −4 into the MPM list.

In an example, after step six, if the MPM list is still not full, adding intra prediction mode in a default mode list into the MPM list if this mode or these modes are not in the MPM list, iteratively this step until the MPM list is full. Step seven adding a VER_IDX, a HOR_IDX, a VER_IDX add an offset −4 or a VER_IDX add an offset 4 into the MPM list into the MPM list, or adding a VER_IDX, a HOR_IDX, a VER_IDX add an offset 4 or a VER_IDX add an offset −4 into the MPM list into the MPM list. For example, if a VER_IDX is not in the MPM list and the MPM list is not full, add the VER_IDX into the MPM list, if the MPM list is full after add the VER_IDX, finish construct the MPM list. Moreover, if the MPM list is still not full after add the VER_IDX, check whether a HOR_IDX is in the MPM list. If the HOR_IDX is in the MPM list, further to check whether a prediction mode which value is equal to the value of VER_IDX add an offset −4 is in the MPM list, if the prediction mode which value is equal to the value of VER_IDX add an offset −4 is not in the MPM list, add the prediction mode which value is equal to the value of VER_IDX add an offset −4 into the MPM list. Iteratively this step until the MPM list is full.

In an example, after step six, if the MPM list is still not full and the left block of the current coding block is not available, adding intra prediction mode in a default mode list into the MPM list if this mode or these modes are not in the MPM list, iteratively this step until the MPM list is full. Step seven adding a VER_IDX, a VDIA_IDX, a DIA_IDX or an intra mode 2 (2) into the MPM list. For example, if a VER_IDX is not in the MPM list and the MPM list is not full, add the VER_IDX into the MPM list, if the MPM list is full after add the VER_IDX, finish construct the MPM list. Moreover, if the MPM list is still not full after add the VER_IDX, check whether a VDIA_IDX is in the MPM list. If the VDIA_IDX is in the MPM list, further to check whether a DIA_IDX is in the MPM list, if the DIA_IDX is not in the MPM list, add the DIA_IDX into the MPM list. Iteratively this step until the MPM list is full.

In an example, after step six, if the MPM list is still not full, the above block of the current coding block is not available, adding intra prediction mode in a default mode list into the MPM list if this mode or these modes are not in the MPM list, iteratively this step until the MPM list is full. Step seven adding a HOR_IDX, an intra mode 2 (2), a DIA_IDX or a VDIA_IDX into the MPM list. For example, if a HOR_IDX is not in the MPM list and the MPM list is not full, add the HOR_IDX into the MPM list, if the MPM list is full after add the HOR_IDX, finish construct the MPM list. Moreover, if the MPM list is still not full after add the HOR_IDX, check whether an intra mode 2 is in the MPM list. If the intra mode 2 is in the MPM list, further to check whether a DIA_IDX is in the MPM list, if the DIA_IDX is not in the MPM list, add the DIA_IDX into the MPM list. Iteratively this step until the MPM list is full.

In an example, after step six, if the MPM list is still not full, the left block of the current coding block is available and the above block of the current coding block is available, adding intra prediction mode in a default mode list into the MPM list if this mode or these modes are not in the MPM list, iteratively this step until the MPM list is full. Step seven adding a VER_IDX, a HOR_IDX, a VER_IDX add an offset −4 or a VER_IDX add an offset 4 into the MPM list.

In one aspect of the present disclosure, a simplified method to construct the 6-entry MPM list is proposed, comprising check the availability of a left block of a current CU. The position of the left block is illustrated by FIG. 5, wherein the left block is labeled by "L".

The left block is not available if no intra prediction information (i.e. intra prediction mode) can be derived from the left block. It includes the following cases. The left block is not an intra-predicted block, the left block does not exist, for example, the current block is a coding block located in the left-most side of a frame, If encoder or decoder support parallel processing, the left block might be considered as not existing (or not available) if it is located in different Tiles of or with the current block, i.e. the current coding block locates or is located in the left-most side of a Tile. In another example, if parallel processing is not supported in an encoder or decoder, the left block might be considered as available if it is located in different Tiles of the current block, i.e. the current coding block locates in the left-most side of a Tile. If parallel processing is supported in encoder or decoder, the left block might be considered as not existing if it is located in the different Slices with the current block, i.e. the current coding block locates in the left-most side of a slice. In another example, if parallel processing is not supported in encoder or decoder, the left block might be considered as available if it is located in the different Slices with the current block, i.e. the current coding block locates in the left-most side of a slice.

Otherwise (i.e., left block is available), include the intra prediction mode of the left block in the 6-entry MPM list.

Check the availability of an above block of the current CU. The position of the above block is illustrated by FIG. 5, wherein the above block is labeled by "A".

The above block is not available if no intra prediction information (i.e. intra prediction mode) can be derived from the above block. It includes the following cases. The above block is not an intra-predicted block. The above block does not exist. For example, the current block is a coding block located in the top-most side of a frame. If parallel processing is supported in encoder or decoder, the top block might be considered as not existing if it is located in the different Tiles with the current block, i.e. the current coding block locates in the top-most side of a Tile. In another example, if parallel processing is not supported in encoder or decoder, the top block might be considered as available if it is located in the different Tiles with the current block, i.e. the current coding block locates in the top-most side of a Tile. If parallel processing is supported in encoder or decoder, the top block might be considered as not existing if it is located in the different Slices with the current block, i.e. the current coding block locates in the top-most side of a slice. In another example, if parallel processing is not supported in encoder or decoder, the top block might be considered as available if it is located in the different Slices with the current block, i.e. the current coding block locates in the top-most side of a slice.

If it is needed to constrain line buffer size in encoder or decoder, the top block might be considered as not existing if it is located in the different CTU with the current block, i.e. the current coding block locates in the top-most side of the current CTU.

In an example, if decoder side or encoder side support line buffer restriction, then an above block located on different CTU with the current block CTU is considered as not existing. If not support line buffer restriction, then consider it exists.

Otherwise (i.e., left block is available), include the intra prediction mode of the top block in the 6-entry MPM list.

Check whether planar (PLANAR_IDX=0) mode has been inserted in the MPM list, (i.e. check either intra mode of the left and the top block are planar mode), only if planar mode has not been inserted in the MPM list, then insert the planar mode into the MPM list. Check whether DC (DC_IDX=1) mode has been inserted in the MPM list, (i.e. check either intra modes of the left and the top block are DC mode), only if DC mode has not been inserted in the MPM list, then insert the DC mode into the MPM list.

If the left block is available and if its intra prediction mode is an angular mode, i.e. (mode>DC_IDX, and say mode is angularLeft), get its nearest two angular modes by performing angularLeft−1, angularLeft+1. Note that when performing −1 or +1 it might involve a wrap up and wrap down operation, for example, If angularLeft is 2, then angularLeft−1 would be 66 (wrap up case), or if angularLeft is 66, then angularLeft+1 would be 2 (wrap down case).

If the prediction mode of angularLeft−1 has not been inserted into the MPM list, insert it into the MPM list.

If the prediction mode of angularLeft+1 has not been inserted into the MPM list, inserted it into the MPM list.

If MPM list is not full and if the above block is available and if its intra prediction mode is an angular mode, i.e. (mode>DC_IDX, and say mode is angularAbove), get its nearest two angular modes by performing angularAbove−1, angularAbove+1. Note that when performing −1 or +1 it might involve a wrap up and wrap down operation, in an example, if angularLeft is 2, then angularLeft−1 would be 66 (wrap up case), or if angularLeft is 66, then angularLeft+1 would be 2 (wrap down case).

If the prediction mode of angularAbove−1 has not been inserted into the MPM list, insert it into the MPM list.

If MPM list is not full (for example, a quantity of prediction modes in the MPM list is less than 6) and if the prediction mode of angularAbove+1 has not been inserted into the MPM list, insert it into the MPM list.

If the MPM list is not full, insert the following modes to MPM list until it is full (for example, a quantity of prediction modes in the MPM list is equal to 6) a VER_IDX, a HOR_IDX, an intra mode 2 (2), a VDIA_IDX or a DIA_IDX.

The present disclosure targets improvement in the intra mode signaling scheme. In the present disclosure, a video decoding method and a video decoder are proposed.

Figure 7:
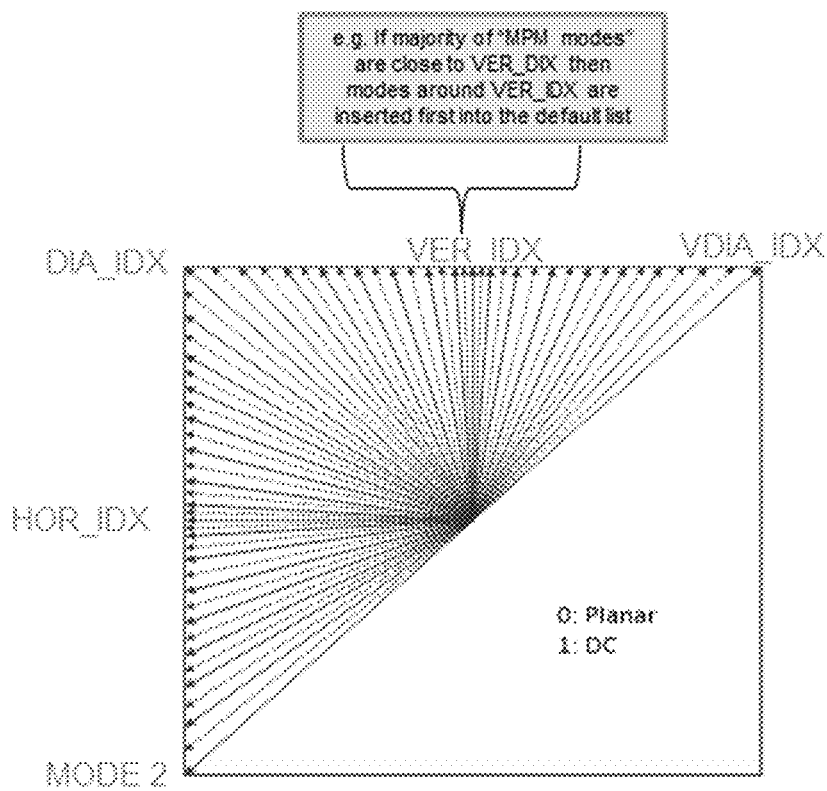
FIG. 7 shows a schematic diagram illustrating an example of the first three modes in remaining mode list generation process.

FIG. 7 shows an example of 67 intra prediction modes, e.g., as proposed for VVC, the plurality of intra prediction modes of 67 intra prediction modes comprising planar mode (index 0), dc mode (index 1), and angular modes with indices 2 to 66, wherein the left bottom angular mode in FIG. 7 refers to index 2 and the numbering of the indices being incremented until index 66 being the top right most angular mode of FIG. 7.

FIG. 13 shows an example of 85 intra prediction modes, where the dashed directions are associated with the wide-angle modes that are applied to non-square blocks.

In another aspect of the present application, a decoder comprising processing circuitry is disclosed configured for carrying out the above decoding methods.

In another aspect of the present application, a computer program product is disclosed which comprising a program code for performing the above decoding methods.

In another aspect of the present application, a decoder for decoding video data is disclosed, the decoder comprising one or more processors, and a non-transitory computer-readable storage medium coupled to the processors and storing programming for execution by the processors, wherein the programming, when executed by the processors, configures the decoder to carry out the above decoding methods.

The processing circuitry can be implemented in hardware, or in a combination of hardware and software, for example by a software programmable processor or the like.

In the following description, reference is made to the accompanying drawings, which form part of the disclosure, and in which are shown, by way of illustration, specific aspects in which the disclosure may be placed.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

FIG. 1 is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In red-blue-green (RBG) format or color space a picture comprises a corresponding red, green and blue sample array. However, in video coding each pixel is typically represented in a luminance/chrominance format or color space, e.g. luma-luma-chrominance (YCbCr), which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid-crystal displays (LCDs), organic light-emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, DSPs, ASICs, FPGAs, discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 2:
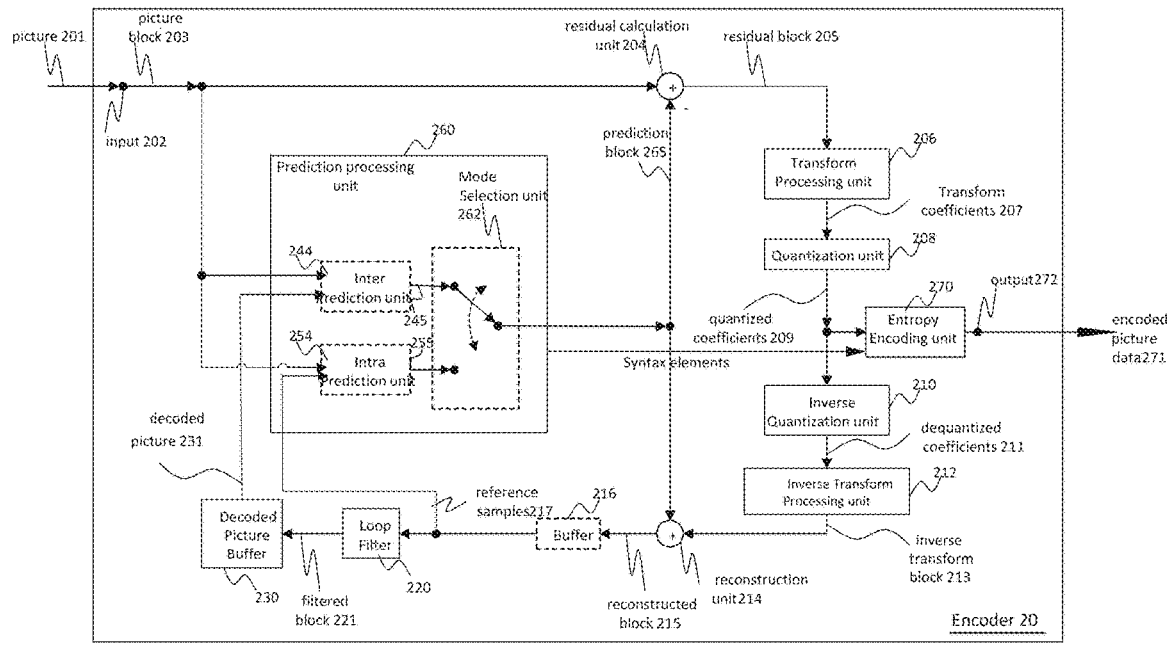
FIG. 2 is a block diagram showing an example of a video encoder configured to implement embodiments of the disclosure.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
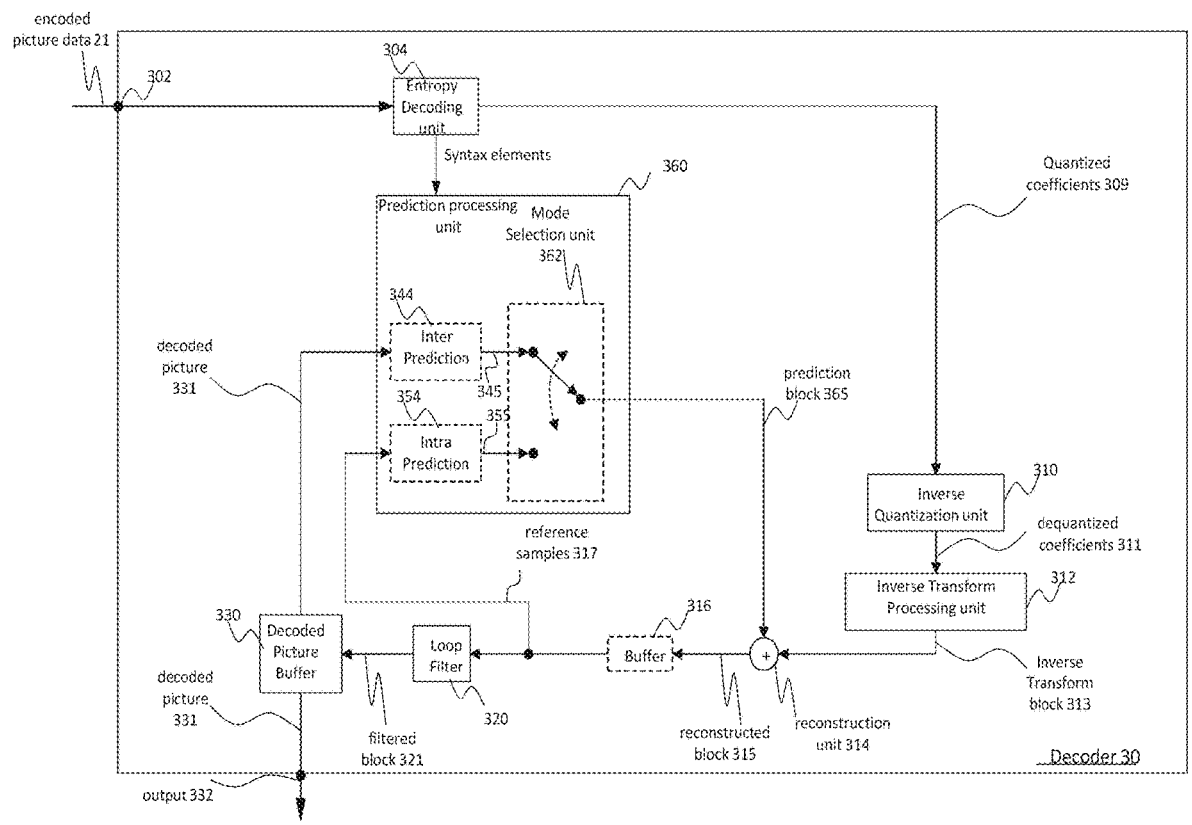
FIG. 3 is a block diagram showing an example structure of a video decoder configured to implement embodiments of the disclosure.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum RDO or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in decoded picture buffer 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse discrete cosine transform (DCT), an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

According to the HEVC/H.265 standard, 35 intra prediction modes are available. As shown in FIG. 4, this set contains the following modes planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and Joint Exploration Model (JEM) platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

A decoder comprising processing circuitry configured for carrying out the above methods.

In the present disclosure, a computer program product comprising a program code is disclosed for performing the above methods.

In the present disclosure, a decoder for decoding video data is disclosed, the decoder comprising one or more processors, and a non-transitory computer-readable storage medium coupled to the processors and storing programming for execution by the processors, wherein the programming, when executed by the processors, configures the decoder to carry out the above methods.

FIG. 7 shows an example of 67 intra prediction modes, e.g., as proposed for VVC, the plurality of intra prediction modes of 67 intra prediction modes comprising planar mode (index 0), dc mode (index 1), and angular modes with indices 2 to 66, wherein the left bottom angular mode in FIG. 7 refers to index 2 and the numbering of the indices being incremented until index 66 being the top right most angular mode of FIG. 7.

Figure 10:
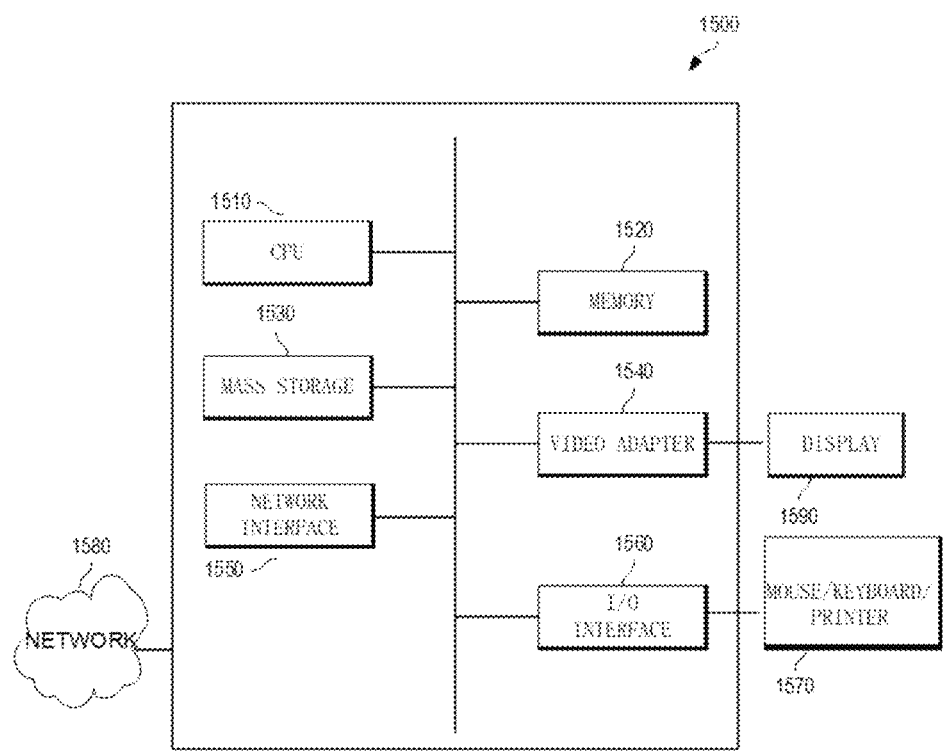
FIG. 10 shows a block diagram of an apparatus.

FIG. 10 is a schematic diagram of a network device 1300 according to an embodiment of the disclosure. The network device 1300 is suitable for implementing the disclosed embodiments as described herein. The network device 1300 comprises ingress ports 1310 and Rx 1320 for receiving data, a processor, logic unit, or CPU 1330 to process the data, Tx 1340 and egress ports 1350 for transmitting the data, and a memory 1360 for storing the data. The network device 1300 may also comprise OE components and EO components coupled to the ingress ports 1310, the Rx 1320, the Tx 1340, and the egress ports 1350 for egress or ingress of optical or electrical signals.

The processor 1330 is implemented by hardware and software. The processor 1330 may be implemented as one or more CPU chips, cores (e.g., as a multi-core processor), FPGAs, ASICs, and DSPs. The processor 1330 is in communication with the ingress ports 1310, Rx 1320, Tx 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be ROM, RAM, TCAM, and/or SRAM.

FIG. 10 is a block diagram of an apparatus 1100 that can be used to implement various embodiments. The apparatus 1100 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more I/O devices, such as a speaker, microphone, mouse, touchscreen, keypad, keyboard, printer, display, and the like. The apparatus 1100 may include one or more CPUs 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as SRAM, dynamic random-access memory (DRAM), synchronous DRAM (SDRAM), ROM, a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1100. For example, the apparatus 1100 may provide Structured Query Language (SQL) command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1100, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1100 to communicate with remote units via the networks 1580. For example, the network interface 1550 may provide communication to database. In an embodiment, the apparatus 1100 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation is, on the one hand, significantly reduces the computational complexity of the distance-weighted prediction mechanism as compared with straightforward weighting coefficient calculation and, on the other hand, helps to achieve higher accuracy of weighting coefficient values as compared with simplifications of other approaches.

The embodiments may be applied to other bidirectional and position dependent intra-prediction techniques (e.g., different modifications of directional interpolation (PDPC)) as well as mechanisms that use weighting coefficients that depend on distance from one pixel to another to blend different parts of a picture (e.g., some blending methods in image processing).

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple compact disks (CDs), disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA or an ASIC.

Processors suitable for the execution of a computer program include, by way of example, both general and special purpose microprocessors, and any one or more processors of any kind of digital computer. Generally, a processor will receive instructions and data from a ROM or a RAM or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, erasable programmable ROM (EPROM), electrically EPROM (EEPROM), and flash memory devices, magnetic disks, for example, internal hard disks or removable disks, magneto-optical disks, and compact disk-ROM (CD-ROM) and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method for constructing a Most Probable Mode (MPM) list for intra prediction, comprising:
    obtaining a first intra prediction mode of a first neighbor block adjacent to a current block;

determining a validity for the first intra prediction mode when the first intra prediction mode is different from a second intra prediction mode of a second neighbor block;

storing the first intra prediction mode into a corresponding validity buffer of a plurality of validity buffers in response to determining the validity; and fetching intra prediction modes from the validity buffers to store the intra prediction modes into the MPM list, wherein the fetching starts from a most valid buffer until either the MPM list contains a maximum number of the intra prediction modes or the intra prediction modes that are stored in the validity buffers are fetched into the MPM list, and wherein determining the validity comprises:

setting the validity to a first value, wherein the first value indicates a valid non-directional prediction mode; and setting the validity to a second value when the first neighbor block is located on a left side of the current block, the first intra prediction mode is greater than or equal to a third value, and less than a difference of a fourth value and a fifth value, wherein the second value indicates a valid directional prediction mode, wherein the third value is an index of a horizontal prediction mode, wherein the fourth value is an index of a vertical prediction mode, and wherein the fifth value is a pre-configured threshold.

2. The method of claim 1, wherein the validity depends on whether the first intra prediction mode is a directional mode, a side of the current block on which the first neighbor block is located, or a direction of the first intra prediction mode.

3. The method of claim 1, wherein determining the validity further comprises setting the validity to the second value when the first neighbor block is located above the current block, the first intra prediction mode is greater than a sum of the third value and the fifth value, and the first intra prediction mode is less than or equal to the fifth value.

4. The method of claim 3, wherein the fifth value is equal to 4.

5. The method of claim 4, wherein a validity for a first validity buffer of the validity buffers is the second value, wherein a validity for a second validity buffer of the validity buffers is the first value, and wherein the first value is less than the second value.

6. The method of claim 1, further comprising:
setting the validity to the second value when the first neighbor block is a left neighbor block or a below left neighbor block; and
setting the validity to a sixth value when the first intra prediction mode is greater than −10 and less than the third value, or when the first intra prediction mode is equal to or greater than a difference of the fourth value and the fifth value, and equal to or less than a sum of the fourth value and the fifth value, wherein the sixth value indicates a strictly invalid directional prediction mode.

7. The method of claim 6, wherein the sixth value is lower than the second value and the first value.

8. The method of claim 1, further comprising:
setting the validity to the second value when the first neighbor block is an above neighbor block or above right neighbor block; and
setting the validity to a sixth value when the first intra prediction mode is greater than the fourth value and is less than 76, or when the first intra prediction mode is equal to or greater than a difference of the third value and the fifth value, and equal to or less than a sum of the third value and the fifth value, wherein the sixth value indicates a strictly invalid directional prediction mode.

9. The method of claim 1, further comprising:
setting the validity to the value when the first neighbor block is an above-left neighbor block; and
setting the validity to a second sixth value when the first intra prediction mode is greater than the third value and less than the fourth value, or when the first intra prediction mode is equal to or greater than a difference of a seventh value and the fifth value, and equal to or less than a sum of 2 and the fifth value, wherein the sixth value indicates strictly invalid directional prediction mode, and wherein the seventh value is an index of a vertical diagonal mode.

10. The method of claim 1, further comprising:
storing the first intra prediction mode into a first buffer having a same validity identification as the first intra prediction mode;
checking whether a second buffer and a third buffer store a number of intra prediction modes that is equal to or greater than a MPM list size, wherein the second buffer is for the valid directional intra prediction mode, and wherein the third buffer is for valid non-directional first intra prediction mode value; and
filling the MPM list when the second buffer and the third buffer store the number of intra prediction modes that is equal to or greater than the MPM list size.

11. The method of claim 3, wherein a buffer does not populate the MPM list and the first intra prediction mode is not stored to any of the validity buffers when the buffer and the first intra prediction mode have the validity of a seventh value, wherein the seventh value indicates a strictly invalid directional intra prediction mode.

12. The method of claim 1, wherein vacant positions within the MPM list are filled by default modes when a number of intra prediction modes stored in the validity buffers is less than a size of the MPM list.

13. A method for decoding an image, comprising:
inferring, from an encoded bitstream, a mode indication;
obtaining a first intra prediction mode of a first neighbor block adjacent to a current block;
determining a validity for the first intra prediction mode when the first intra prediction mode is different from a second intra prediction mode of a second neighbor block;
storing the first intra prediction mode into a corresponding validity buffer of a plurality of validity buffers in response to determining the validity;
fetching intra prediction modes from the validity buffers to store the intra prediction modes into a Most Probable Mode (MPM) list, wherein the fetching starts from a most valid buffer until either the MPM list contains a maximum number of prediction modes or the intra prediction modes that are stored in the validity buffers are fetched into the MPM list; and
reconstructing the current block in the image, according to the mode indication, as a pointer to the MPM list, wherein determining the validity comprises:
setting the validity to a first value, wherein the first value indicates a valid non-directional prediction mode; and
setting the validity to a second value when the first neighbor block is located on a left side of the current block, the first intra prediction mode is greater than or equal to a third value, and less than a difference of a fourth value and a fifth value,
wherein the second value indicates a valid directional prediction mode, wherein the third value is an index of a horizontal prediction mode, wherein the fourth value is an index of a vertical prediction mode, and wherein the fifth value is a pre-configured threshold.

14. A method for encoding an image, comprising:
obtaining a first intra prediction mode of a first neighbor block adjacent to a current block;
determining a validity for the first intra prediction mode when the first intra prediction mode is different from a second intra prediction mode of a second neighbor block;
storing the first intra prediction mode into a corresponding validity buffer of a plurality of validity buffers in response to determining the validity;
fetching intra prediction modes from the validity buffers to store the intra prediction modes into a Most Probable Mode (MPM) list, wherein the fetching starts from a most valid buffer until either the MPM list contains a maximum number of prediction modes or the intra prediction modes that are stored in the validity buffers are fetched into the MPM list;
determining a mode indication for the current block as a pointer into the MPM list; and
including the mode indication into an encoded bitstream, wherein determining the validity comprises:
setting the validity to a first value, wherein the first value indicates a valid non-directional prediction mode; and
setting the validity to a second value when the first neighbor block is located on a left side of the current block, the first intra prediction mode is greater than or equal to a third value, and less than a difference of a fourth value and a fifth value,
wherein the second value indicates a valid directional prediction mode, wherein the third value is an index of a horizontal prediction mode, wherein the fourth value is an index of a vertical prediction mode, and wherein the fifth value is a pre-configured threshold.

15. An apparatus for constructing a Most Probable Mode (MPM) list for intra prediction, comprising:
a processor; and
a memory coupled to the processor and configured to store instructions that, when executed by the processor, cause the apparatus to be configured to:
obtain a first intra prediction mode of a first neighbor block adjacent to a current block;
determine a validity for the first intra prediction mode when the first intra prediction mode is different from a second intra prediction mode of a second neighbor block;
store the first intra prediction mode into a corresponding validity buffer of a plurality of validity buffers in response to determining the validity; and
fetch intra prediction modes from the validity buffers to store the intra prediction modes into the MPM list, wherein the fetching starts from a most valid buffer until either the MPM list contains a maximum number of prediction modes or the intra prediction modes that are stored in the validity buffers are fetched into the MPM list, and wherein in a manner to determine the validity, the instructions that, when executed by the processor, further cause the apparatus to be configured to:
set the validity to a first value, wherein the first value indicates a valid non-directional prediction mode; and
set the validity to a second value when the first neighbor block is located on a left side of the current block, the first intra prediction mode is greater than or equal to a third value, and less than a difference of a fourth value and a fifth value,
wherein the second value indicates a valid directional prediction mode, wherein the third value is an index of a horizontal prediction mode, wherein the fourth value is an index of a vertical prediction mode, and wherein the fifth value is a pre-configured threshold.

16. The apparatus of claim 15, wherein the validity depends on at least one of whether the first intra prediction mode is a directional mode, a side of the current block on which the first neighbor block is located, or a direction of the first intra prediction mode.

17. The apparatus of claim 15, wherein the instructions that, when executed by the processor, further cause the apparatus to be configured to
set the validity to the second value when the first neighbor block is located above the current block, the first intra prediction mode is greater than a sum of the third value and the fifth value, and the first intra prediction mode is less than or equal to the fourth value.

18. The apparatus of claim 17, wherein the fifth value is equal to 4.

19. The apparatus of claim 18, wherein a validity for a first buffer of the validity buffers is the second value, wherein a validity for a second buffer of the validity buffers is the first value, and wherein the first value is less than the second value.

20. The apparatus of claim 17, wherein the instructions that, when executed by the processor, further cause the apparatus to be configured to:
set the validity for the first neighbor block to the second value when the first neighbor block is a left neighbor block or a below left neighbor block; and
set the validity for the first neighbor block to a sixth value when the first intra prediction mode is greater than −10 and is less than the third value, or when the first intra prediction mode is equal to or greater than a difference of the fourth value and the fifth value and equal to or less than a sum of the fourth value plus the fifth value, wherein the sixth value indicates a strictly invalid directional intra prediction mode.

* * * * *